(12) United States Patent
Sakamoto

(10) Patent No.: US 7,242,118 B2
(45) Date of Patent: Jul. 10, 2007

(54) TOROIDAL-COIL LINEAR STEPPING MOTOR, TOROIDAL-COIL LINEAR RECIPROCATING MOTOR, CYLINDER COMPRESSOR AND CYLINDER PUMP USING THESE MOTORS

(75) Inventor: Masafumi Sakamoto, Kiryu (JP)

(73) Assignee: Japan Servo Co., Ltd., Tokyo-to (JP)

( * ) Notice: Subject to any disclaimer, the term of this patent is extended or adjusted under 35 U.S.C. 154(b) by 332 days.

(21) Appl. No.: 10/901,967

(22) Filed: Jul. 30, 2004

(65) Prior Publication Data
US 2005/0023905 A1 Feb. 3, 2005

(30) Foreign Application Priority Data
Jul. 31, 2003 (JP) .......................... 2003-204517
Sep. 4, 2003 (JP) .......................... 2003-312264
Jul. 21, 2004 (JP) .......................... 2004-212514

(51) Int. Cl.
*H02K 41/03* (2006.01)
*H02K 33/16* (2006.01)
(52) U.S. Cl. ...................................... 310/15
(58) Field of Classification Search ............ 310/12–14, 310/15, 49 R; 335/220, 222, 227, 229, 234; 417/254
See application file for complete search history.

(56) References Cited

U.S. PATENT DOCUMENTS

| | | | | | |
|---|---|---|---|---|---|
| 3,286,911 | A | * | 11/1966 | Clarke | 417/254 |
| 3,675,031 | A | * | 7/1972 | Lavigne | 290/1 R |
| 4,339,679 | A | * | 7/1982 | Urschel | 310/49 R |
| 4,739,201 | A | * | 4/1988 | Brigham et al. | 310/49 R |
| 4,810,915 | A | * | 3/1989 | Lissenburg et al. | 310/37 |
| 4,827,163 | A | * | 5/1989 | Bhate et al. | 310/15 |
| 6,504,272 | B2 | | 1/2003 | Sakamoto | |
| 6,765,321 | B2 | | 7/2004 | Sakamoto | |
| 2002/0008601 | A1 | * | 1/2002 | Yajima et al. | 335/220 |
| 2004/0090295 | A1 | * | 5/2004 | Yajima et al. | 335/229 |

FOREIGN PATENT DOCUMENTS

| | | | | |
|---|---|---|---|---|
| JP | 55-10885 | * | 1/1980 | 310/15 |
| JP | 61-277362 | * | 12/1986 | 310/12 |
| JP | 10-191619 | | 7/1998 | |

OTHER PUBLICATIONS

Patent Abstract of Japan, JP 10-191619, Jul. 21, 1998.

* cited by examiner

*Primary Examiner*—Tran Nguyen
(74) *Attorney, Agent, or Firm*—Oblon, Spivak, McClelland, Maier & Neustadt, P.C.

(57) ABSTRACT

A toroidal-coil multi-phase linear stepping motor includes a cylindrical housing, an axis coaxially arranged inside the housing, a cylindrical element supported by the axis and an armature fixed to the housing around the cylindrical element through an air gap in the radial direction. The axis is fixed to the housing and the cylindrical element linearly moves along the axis. The cylindrical element has toroidal permanent magnets that are alternately magnetized in N pole and S pole in the axial direction. The armature consists of armature units arranged around the axis. Each armature unit has a toroidal coil and a pair of armature yokes that hold the toroidal coil. Each armature yoke has toroidal magnetic teeth on its inner surface. The invention also includes a toroidal-coil single-phase linear reciprocating motor and a cylinder compressor and a cylinder pump using these motors.

9 Claims, 17 Drawing Sheets

(1)

(2)

(3)

(4)

(1)

(2)

(3)

TOROIDAL-COIL LINEAR STEPPING MOTOR, TOROIDAL-COIL LINEAR RECIPROCATING MOTOR, CYLINDER COMPRESSOR AND CYLINDER PUMP USING THESE MOTORS

BACKGROUND OF THE INVENTION

1. Field of the Invention

The present invention relates to a linear motor that is available to be used in various industrial devices. Particularly, the present invention relates to a toroidal-coil linear stepping motor and a toroidal-coil linear reciprocating motor that have toroidal coils in their armatures. Further, the present invention relates to a cylinder compressor and a cylinder pump using such a linear stepping motor or a linear reciprocating motor.

2. Prior Art

Japanese unexamined patent publication Hei 10-191619 discloses a conventional linear stepping motor. FIG. 4 of the publication discloses a construction where a movable body 4 having wheels 3 slides on a linear rail 1 on which many stator teeth 2 are formed. Each of cores 8a and 8b of the movable body 4 is provided with small teeth 9 that face the stator teeth 2. When an electric current is applied to coils 28 and 28 that are wound around the respective cores in a predetermined sequence, the movable body 4 moves along the linear rail 1 by electromagnetic force that acts between the stator teeth 2 and the small teeth 9.

However, in the linear stepping motor disclosed in the above publication, since the movable body (a moving element) 4 faces the linear rail 1 as the stator from one side, electromagnetic force so-called "side pull" in a direction vertical to the moving direction (electromagnetic force to bring the movable body close to the rail) acts in addition to the electromagnetic force in the moving direction.

Accordingly, the one-side-facing type linear stepping motor disclosed in the publication requires a guide mechanism such as the wheel 3 for the movable body 4 and a mechanism such as a linear bearing to receive the side pull so that the side pull dose not prevents the linear movement of the movable body, which increases the cost because of a complex mechanism.

On the other hand, as shown FIG. 28, a toroidal-coil two-phase linear stepping motor that consists of a cylindrical stator 1 and a movable rod 2 arranged in the stator 1 has been known. The stator 1 has two sets of stator units 3 and 4 that are arranged in the axial direction and a permanent magnet 5 embedded therebetween. The stator units 3 and 4 are provided with toroidal coils 3a and 4a, and armature yokes 3b and 4b that hold the toroidal coils. On the inner surface of each stator unit, toroidal magnetic teeth 3c and 4c are formed by alternately repeating projections and depressions in the axial direction. The movable rod 2 has many toroidal magnetic teeth 2a that can face the toroidal magnetic teeth 3c and 4c.

According to the construction of FIG. 28, when the electric current is applied to the toroidal coils 3a and 4a by turns, the movable rod 2 can linearly move. Since the movable rod 2 faces the stator 1 in 360 degrees, the side pull is not generated. However, in the toroidal coil linear stepping motor shown in FIG. 28, the magnetic flux density through the magnetic teeth at the side of the permanent magnet 5 is higher than that at the opposite side thereof, which causes nonuniform distribution of magnetic flux. For example, when the toroidal coil 4a at the right side is excited, the magnetic flux density through the magnetic teeth at the left side of the coil is higher than that through the magnetic teeth at the right side of the coil. On the other hand, when the toroidal coil 3a at the left side is excited, the magnetic flux density through the magnetic teeth at the right side of the coil becomes higher than that through the magnetic teeth at the left side of the coil. This breaks the balance between thrusts of the respective phases, which lowers the positioning accuracy.

Incidentally, the structure shown in FIG. 29 has been known as a compressor for a car's air conditioner. The compressor shown in FIG. 29 reciprocates pistons by driving power transmitted from a car's engine through an electromagnetic clutch. The electromagnetic clutch is provided with a driving wheel 10 that is rotated by the driving power of the engine and a driven wheel 12 that is pressed against the driving wheel 10 to transmit the driving power when the coil 11 is excited. The rotation of the driven wheel 12 rotates a circular plate 13 that is diagonally fixed to the rotation axis of the driven wheel 12. A circular groove is formed on the circular plate 13 to which balls 14 are engaged. Pistons 16 that reciprocate in cylinders 15 are connected to the balls 14, respectively. Rotating the circular plate 13, the balls 14 follow the displacement of the engaged positions on the circular plate 13, which reciprocates the pistons 16 within the cylinders 15. The cylinders 15 have intake ducts and exhaust ducts, and compressed gas is supplied to an evaporator (not shown).

In the mechanism of FIG. 29, a compression ratio can be adjusted by setting the inclination angle of the circular plate 13. However, the inclination angle is determined at a manufacturing stage for each product and it cannot be changed during use. Further, a complicated wobble action applies large mechanical stress on the mechanism, which shortens useful life of the mechanism.

If a linear motor is used as a driving source of a compressor to reciprocate a piston within a cylinder, the compression ratio can be easily adjusted during use and the mechanical stress can be lowered. However, if a piston of a compressor is only connected to a linear stepping motor, respective spaces for the cylinder and the linear stepping motor are necessary, and a mechanism for guiding a movable portion is required inside the linear stepping motor, which hinders from making the device compact.

SUMMARY OF THE INVENTION

An object of the present invention is to solve the above-described problems of the conventional machines and to provide an improved toroidal-coil linear stepping motor, an improved toroidal-coil linear reciprocating motor that do not cause the side pull, do not has deviation of the magnetic flux and have high positioning accuracy. Further object of the present invention is to provide a compact cylinder compressor and cylinder pump using these motors.

The toroidal-coil linear stepping motors according to the present invention are classified into (1) a multi-phase linear stepping motor having a plurality of toroidal coils, and (2) a single-phase linear reciprocating motor having a single toroidal coil.

(1) The multi-phase toroidal-coil linear stepping motor according to the present invention comprises an armature having a plurality of armature units each of which consists of a toroidal coil and a pair of armature yokes made from magnetic material to hold the toroidal coil, the armature units being coaxially arranged without interposing a permanent magnet; a cylindrical element having a magnetic structure facing the armature through an air gap in a radial direction, the cylindrical element enabling linear relative movement with respect to the armature in the axial direction; an axis for supporting one of the armature and the cylindrical element; and a housing for supporting the axis, the other of the armature and the cylindrical element being coaxially fixed to the housing. Each of the pair of armature yokes has toroidal magnetic teeth that are formed by alternately repeating projections and depressions in the axial direction on the surface facing the cylindrical element or has at least one pair of toroidal permanent magnets that are alternately magnetized in N pole and S pole in the axial direction. Magnetic force acted between the armature and the magnetic structure of the cylindrical element generated by the energized toroidal coil relatively and linearly moves one of the armature and the cylindrical element along the axis with respect to the housing, or relatively and linearly moves one of the armature and the cylindrical element together with the axis with respect to the housing.

(1) The multi-phase toroidal-coil linear stepping motors can be classified into the following three groups in view of constructions of the armature and the cylindrical element that form a magnetic circuit.

(1-1) The magnetic structure of the cylindrical element has toroidal permanent magnets that are alternately magnetized in N pole and S pole in the axial direction, and each of the pair of armature yokes has toroidal magnetic teeth that are formed by alternately repeating projections and depressions in the axial direction on the surface facing the cylindrical element.

(1-2) The magnetic structure of the cylindrical element has toroidal magnetic teeth that are formed by alternately repeating projections and depressions in the axial direction, and each of the pair of armature yokes has toroidal permanent magnets that are alternately magnetized in N pole and S pole in the axial direction on the surface facing the cylindrical element.

(1-3) The magnetic structure of the cylindrical element has toroidal magnetic teeth that are formed by alternately repeating projections and depressions in the axial direction, and each of the pair of armature yokes has toroidal magnetic teeth that are formed by alternately repeating projections and depressions in the axial direction on the surface facing the cylindrical element.

For the types (1-1) and (1-2), the armature consists of P (P is an integer equal to or larger than 2) pieces of the armature units, (1-1) assuming that the pitch between the permanent magnets of the cylindrical element having the same polarity is $\tau$, the pitch of the toroidal magnetic teeth of the each armature unit being nearly equal to $\tau$, or (1-2) assuming that the pitch of the toroidal magnetic teeth of the cylindrical element is $\tau$, the pitch between the permanent magnets of the each armature unit having the same polarity being nearly equal to $\tau$, when the permanent magnets having the predetermined polarity correctly face the toroidal magnetic teeth in one armature unit, the permanent magnets having the same polarity as the correctly faced permanent magnets preferably deviate from the toroidal magnetic teeth in the other armature units by $\tau/(2P), 2\tau/(2P), \ldots, n\tau/(2P)$ where n is integer satisfying $1 \leq n < P$.

For the type (1-3), the armature consists of P (P is an odd integer equal to or larger than 3) pieces of the armature units, assuming that the pitch of the toroidal magnetic teeth of the cylindrical element is $\tau$, the pitch of the toroidal magnetic teeth of the each armature unit being nearly equal to $\tau$, when the toroidal magnetic teeth of one of the armature units correctly face the toroidal magnetic teeth of the cylindrical element, the toroidal magnetic teeth of the other armature units preferably deviate from the toroidal magnetic teeth of the cylindrical element by $\tau/P, 2\tau/P, \ldots, n\tau/P$, where n is integer satisfying $1 \leq n < P$.

For the multi-phase type, it is preferable to arrange non-magnetic substances between the respective armature units. Further, if the armature consists of three armature units, the three toroidal coils may be connected as a star connection or a delta connection to be driven by three-terminal drive. Or, the relative position and/or relative moving speed between the armature and the cylindrical element may be detected to determine timing for exciting the toroidal coil of the next phase.

The multi-phase toroidal-coil linear stepping motor of the present invention is suitable to be used as a driving source for a syringe pump or a cylinder compressor. For the cylinder compressor, one or two cylinders are preferably driven by one linear motor so that one to-and-fro motion of the linear motor enables intake of gas and exhaust of compressed gas. Further, a compression apparatus may include a plurality of cylinder compressors. In such a case, phases of the driving cycles of the cylinder compressors may be different to each other. The stroke of the linear motor can be adjustable to change the output of the compressor.

On the other hand, (2) the single-phase linear reciprocating motor comprises an armature having a toroidal coil and a pair of armature yokes made from magnetic material to hold the toroidal coil; a cylindrical element having a magnetic structure facing the armature through an air gap in a radial direction, the cylindrical element enabling linear relative movement with respect to the armature in the axial direction; an axis for supporting one of the armature and the cylindrical element; and a housing for supporting the axis, the other of the armature and the cylindrical element being coaxially fixed to the housing. Each of the pair of armature yokes has toroidal magnetic tooth that is formed as a projection on the surface facing the cylindrical element or has a pair of toroidal permanent magnets that are alternately magnetized in N pole and S pole in the axial direction. Magnetic force acted between the armature and the magnetic structure of the cylindrical element generated by the energized toroidal coil relatively reciprocates one of the armature and the cylindrical element along the axis with respect to the housing, or relatively reciprocates one of the armature and the cylindrical element together with the axis with respect to the housing.

(2) The single-phase toroidal-coil linear reciprocating motors can be classified into the following three groups in view of constructions of the armature and the cylindrical element that form a magnetic circuit.

(2-1) Each of the armature yokes has a single toroidal magnetic tooth, and the magnetic structure of the cylindrical element has two pairs of permanent magnets of S pole and N pole, one pair of the permanent magnets can face the toroidal magnetic tooth of one of the armature yokes and the other pair of the permanent magnets can face the toroidal magnetic tooth of the other of the armature yokes, and wherein the two pairs of permanent magnets are arranged so that one toroidal magnetic tooth faces N pole of one pair of permanent magnets when the other toroidal magnetic tooth faces S pole of the other pair of permanent magnets.

(2-2) The magnetic structure of the cylindrical element has a pair of toroidal magnetic teeth, one of the armature yokes has a pair of permanent magnets of S pole and N pole that can face one of the toroidal magnetic teeth, and the other of the armature yokes has a pair of permanent magnets of S pole and N pole that can face the other of the toroidal magnetic teeth, and wherein the two pairs of permanent magnets are arranged so that one toroidal magnetic tooth faces N pole of one pair of permanent magnets when the other toroidal magnetic tooth faces S pole of the other pair of permanent magnets.

(2-3) Each of the armature yokes has a single toroidal magnetic tooth, and the magnetic structure of the cylindrical element has a pair of moving units each of which has a permanent magnet magnetized in S pole and N pole in the axial direction and a pair of magnetic poles sandwiching the permanent magnet from both sides in the axial direction, and wherein the permanent magnets of the moving units are arranged so that the directions of magnetizations are opposite to each other and so that one toroidal magnetic tooth faces the magnetic pole contacting N pole of one moving unit when the other toroidal magnetic tooth faces the magnetic pole contacting S pole of the other moving unit.

In any case of (1) the multi-phase type and (2) the single-phase type, there are the following four combinations defining the stator portion and the movable portion.

(a) The cylindrical element is supported by the axis, and the armature is fixed to the housing around the cylindrical element through an air gap in the radial direction, and wherein the axis is fixed to the housing, whereby the cylindrical element relatively and linearly moves along the axis with respect to the housing.

(b) The cylindrical element is supported by the axis, and the armature is fixed to the housing around the cylindrical element through an air gap in the radial direction, and wherein the axis can linearly move in the axial direction with respect to the housing, whereby the cylindrical element relatively and linearly moves together with the axis with respect to the housing.

(c) The armature is supported by the axis, and the cylindrical element is fixed to the housing around the armature through an air gap in the radial direction, and wherein the axis is fixed to the housing, whereby the armature relatively and linearly moves along the axis with respect to the housing.

(d) The armature is supported by the axis, and the cylindrical element is fixed to the housing around the armature through an air gap in the radial direction, and wherein the axis can linearly move in the axial direction with respect to the housing, whereby the armature relatively and linearly moves together with the axis with respect to the housing.

These combinations (a), (b), (c) and (d) can be applied to any types of (1-1), (1-2), (1-3), (2-1), (2-2), (2-3). In addition, the phrase "relatively and linearly move" includes a case where the cylindrical element moves while the housing is fixed and a case where the housing moves while the cylindrical element is fixed, for the combination (a).

A cylinder compressor or a cylinder pump according to the present invention comprises the single-phase toroidal-coil linear reciprocating motor, wherein the cylindrical element is fixed to the axis so that they linearly move together; a pair of cylinders that are attached at both side of the housing in the axial direction; and a pair of pistons that are attached at the respective ends of the axis. When an electric current is applied to the toroidal coil, the pistons reciprocate within the cylinders in the axial direction to pressure and exhaust gas or liquid. In such a case, a pair of springs are preferably arranged between the piston and the cylinder or between the piston and a stator portion, and frequency of the applied alternating current is preferably adjusted to resonant frequency to cause resonance of the pistons in consideration of spring constant of the springs and inertia of the moving portion.

According to the multi-phase toroidal-coil linear stepping motor of the present invention, since the cylindrical element faces the cylindrical armature in 360 degrees through an air gap in the radial direction, the side pull is not generated, which reduces the load on the guide mechanism.

Further, since a permanent magnet is not arranged between the respective armature units, there is no deviation of the magnetic flux, which keeps high positioning accuracy. Particularly, when a surface magnet exposed to the air gap shown in (1-1), (1-2), (2-1) and (2-2) is used with a back yoke, the magnetic flux density can be balanced among the phases, which standardizes thrusts and increases positioning accuracy as compared with the embedded permanent magnet in the prior art shown in FIG. 28.

On the other hand, the single-phase toroidal-coil linear reciprocating motor of the present invention can simplify the structure rather than the multi-phase motor. Further, applying an alternating current to the single-phase toroidal coil, a movable portion vibrates. When a linear motor is used as a driving source of a compressor, the single-phase motor has higher efficiency and lower cost than the multi-phase motor. That is, a composite thrust of the multi-phase motor driven by a multi-phase excitation is not equal to the sum of the thrusts of the respective phase. For example, the efficiency in two-phase excitation is equal to $$\frac{\sqrt{2}}{2}$$

(about 70%) for the multi-phase motor. On the other hand, the efficiency of the single-phase motor is about 100% in theory because it is always driven by a single-phase excitation.

According to the cylinder compressor of the present invention, since the axis fixed to the cylindrical element is connected to the pistons, the cylinders of the compressor can be used as bearings, which negates the needs for a guide mechanism in the linear motor, making the compressor compact as a whole. Still further, the similar construction can be used as a pump.

DESCRIPTION OF THE ACCOMPANYING DRAWINGS

DESCRIPTION OF THE EMBODIMENTS

Hereinafter, embodiments of the toroidal-coil linear stepping motor, the toroidal-coil linear reciprocating motor and the cylinder compressor using these motors will be described with reference to accomplished drawings.

First Embodiment

Figure 1:
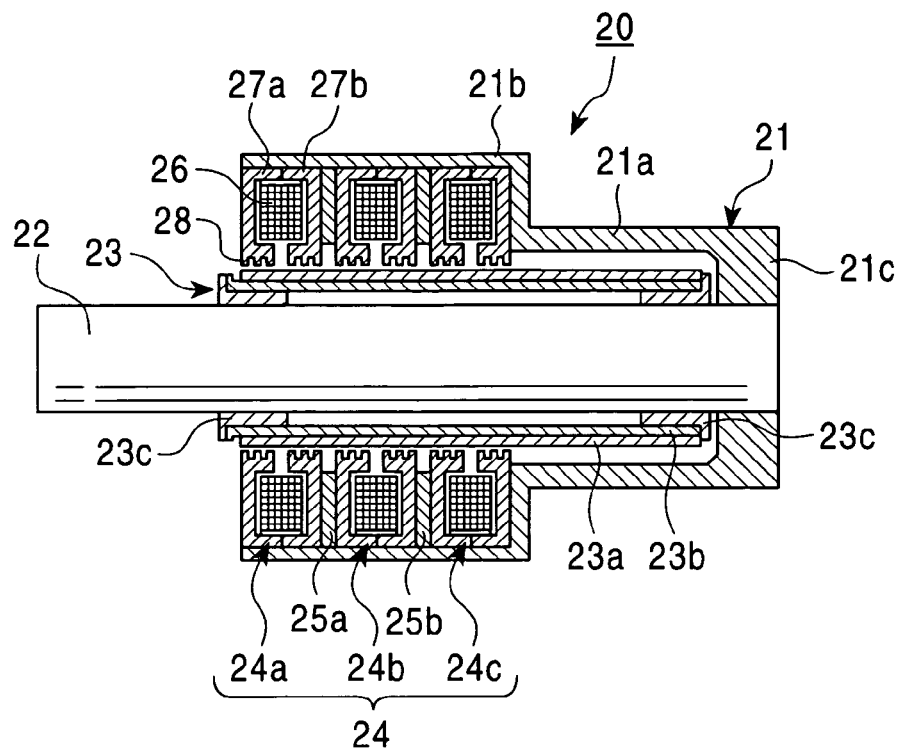
FIG. 1 is a sectional view of a toroidal-coil three-phase linear stepping motor according to a first embodiment.
Figure 2:
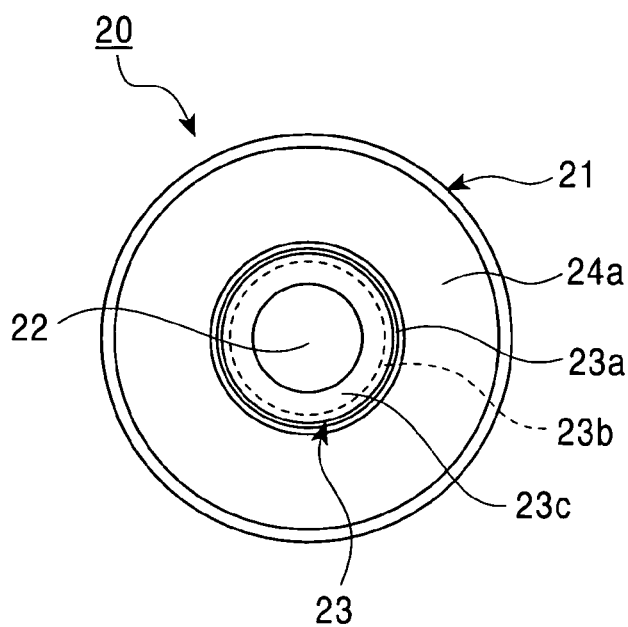
FIG. 2 is a front view of the motor in FIG. 1.

FIG. 1 is a sectional view of the toroidal-coil three-phase linear stepping motor according to the first embodiment and FIG. 2 is a front view of the motor in FIG. 1. The toroidal-coil three-phase linear stepping motor 20 of the first embodiment is provided with a cylindrical housing 21 that consists of a small-diameter portion 21a and a large-diameter portion 21b connected to each other, an axis 22 coaxially arranged inside the housing 21, a cylindrical element 23 that is supported by the axis 22 and an armature 24 that is fixed to the housing 21 around the cylindrical element 23 through an air gap in the radial direction. The cylindrical element 23 can linearly move along the axis 22.

Figure 3:
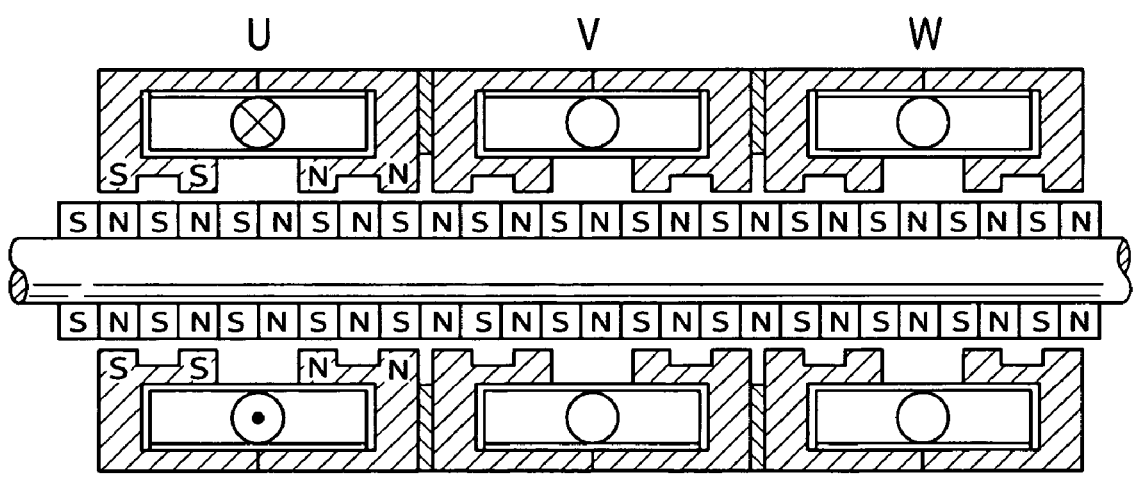
FIG. 3 is an enlarged general sectional view of the toroidal-coil three-phase linear stepping motor of the first embodiment.

The axis 22 is inserted and fixed into a holding hole formed on a bottom wall 21c that stops up the end of the small-diameter portion 21a of the housing 21. The cylindrical element 23 has toroidal permanent magnets 23a that are alternately magnetized in N pole and S pole in the axial direction, a back yoke 23b that holds the permanent magnets 23a at the inside thereof, and a pair of bearings 23c attached to both ends of the back yoke 23b. The arrangement of the permanent magnets 23a is generally shown in FIG. 3. The back yoke 23b is made from magnetic material, it enhances the magnetizing force of the permanent magnets 23a and forms magnetic paths of the permanent magnets. The bearing 23c is a sleeve bearing formed from low friction resin or porous bearing metal. The permanent magnets 23a, the back yoke 23b and the bearings 23c can linearly move along the axis 22 as a whole. When an object is connected to the cylindrical element 23, the object can be moved linearly.

The armature 24 consists of three armature units 24a, 24b and 24c arranged around the axis 22, and non-magnetic substances 25a and 25b arranged between the respective armature units. The armature unit 24a has a toroidal coil 26 that is wound around the axial line, and a pair of armature yokes 27a and 27b that hold the toroidal coil 26. The other armature units 24b and 24c have the same structure as the armature unit 24a. The armature yokes 27a and 27b are formed so that they cover the toroidal coil 26 at the inner side and the outer side. This structure of the armature yokes enhances output and efficiency of the motor. The armature yoke of that shape can be made by sinter molding from magnetic material. In addition, the outer portion of the armature yoke that covers around the toroidal coil 26 may be deleted. In such a case, the housing 21 should have the function of the deleted portion. It is preferable to use the non-magnetic substances 25a and 25b in order to separate the magnetic paths of the respective armature units.

Each of the armature yokes 27a and 27b has three toroidal magnetic teeth 28 on its inner surface. The toroidal magnetic teeth 28 are projecting portions formed by alternately repeating projections and depressions, and they are annularly formed along the inner surfaces of the armature yokes 27a and 27b. The toroidal magnetic teeth 28 of one armature yoke 27a and the toroidal magnetic teeth 28 of the other armature yoke 27b are magnetized in opposite polarities when the toroidal coil 27 is excited. That is, the motor of the first embodiment belongs to the group (1-1) in view of the magnetic circuit and belongs to the group (a) in view of the structure.

According to the above construction, when the toroidal coils 26 are excited, the magnetic force acted between the armature 24 and the magnetic structure (the permanent magnet 23a) of the cylindrical element 23 linearly moves the cylindrical element 23 along the axis 22. Since the armature 24 employs the toroidal coils, the structure of the armature is simple. Further, since the cylindrical element 23 faces the armature 24 in 360 degrees, the side pull is canceled, which enables a smooth linear movement of the cylindrical element along the axis because of the extremely small load on the bearings in the radial direction. Therefore, it is unnecessary to use a guide mechanism such as a linear guide to keep an air gap, which can provide an inexpensive linear stepping motor.

Further, since the motor of the first embodiment is a three-phase motor (P=3), it is insensitive to the third harmonic of the magnetic field and the electric current, which can provide a low-vibration linear stepping motor. On the other hand, while a two-phase motor (P=2) becomes simpler in structure, it is sensitive to the third harmonic, which has higher vibration than the three-phase motor.

Still further, when a moving element faces a stator from one side as disclosed in Japanese unexamined patent publication Hei 10-191619, the facing area S between the movable element and the stator via an air gap becomes DL, where D is a width of magnetic teeth portion of a rail and L is length of the rail. On the other hand, when a moving element (cylindrical element 23) faces a stator in 360 degrees, the facing area via an air gap becomes $(\pi/2)DL$, assuming that the average diameter of the air gap is D/2. That is, the facing area of the present invention is 1.57 times of the conventional structure. Since torque of a motor is proportional to the facing area, the coaxial arrangement of the invention has higher efficiency and higher torque than the one-side facing structure as the prior art.

Figure 4:
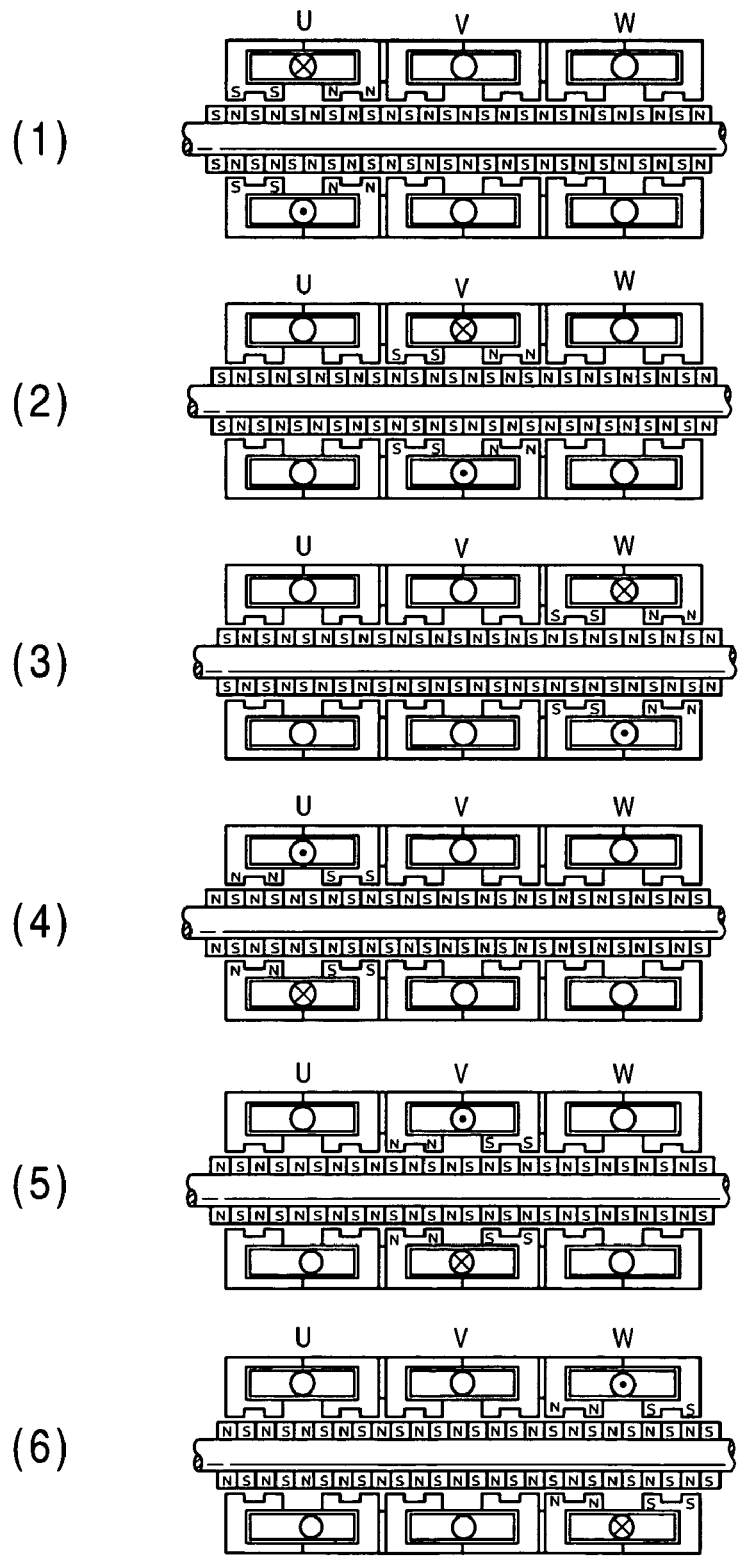
FIG. 4 shows movements of the motor in FIG. 3.

Next, detail magnetic constructions and movement of the toroidal-coil three-phase linear stepping motor 20 in the first embodiment will be described. FIG. 3 is an enlarged sectional view of the generic construction of the motor of the first embodiment, and FIG. 4 shows the movement of the motor in FIG. 3. The armature consists of three phases, U-phase, V-phase and W-phase. Actually, three toroidal coils may be connected as a star connection or a delta connection with three-terminal input to be driven by two-phase or three-phase drive. For the star connection, winding-end terminals of respective coils are connected to one another. For the delta connection, a winding-end terminal of the U-phase connects to a winding-end terminal of the V-phase, a winding-end terminal of the V-phase connects to a winding-end terminal of the W-phase, and a winding-end terminal of the W-phase connects to a winding-end terminal of the U-phase. However, the following description shows single-phase drive for the purpose of avoiding complication of the illustration.

In FIG. 3 and FIG. 4, an electric current applied to a coil of each phase is illustrated based on the Ampere's right-handed screw rule. For example, the symbol in the upper part of the coil of the U-phase means a tip of the screw, it means the electric current progresses in a direction projecting from the paper surface. Further, the symbol in the lower part of the coil of the U-phase means a head of the screw, it means the electric current progresses in a direction entering into the paper surface. The symbols indicated in other drawings have the same meanings.

Assuming that the pitch between the permanent magnets 23a of the cylindrical element 23 having the same polarity is τ, the pitch of the toroidal magnetic teeth of the each of the armature unit 24a, 24b and 24c is nearly equal to τ. FIG. 3 shows the condition where the coil of the U-phase is excited. The toroidal magnetic teeth of the U-phase that are magnetized by the toroidal coil of the U-phase attract and correctly face the opposite polarities of the permanent magnets via the air gap. At the time, the toroidal magnetic teeth of the armature yoke of the V-phase deviates from the N poles of the permanent magnets by τ/(2P), and the toroidal magnetic teeth of the armature yoke of the W-phase deviates from the N poles of the permanent magnets by 2τ/(2P). In this case, since P=3, assuming that τ=2π, the deviation of the V-phase is π/3, that of the W-phase is 2π/3. The amount τ/(2P) becomes a step moving amount. That is, the step moving amount of the two-phase motor is ¼ of the pitch τ, and the step moving amount of the three-phase motor is ⅙ of the pitch τ.

Basically, the pitch of the toroidal magnetic teeth formed on the armature yoke is determined to be identical to the pitch of the permanent magnets of the cylindrical element having the same polarity. However, the pitches may be set different in order to weaken the cogging torque. The expression "nearly equal to τ" includes the condition where these pitches are slightly different to weaken the cogging torque in addition to the condition where these pitches are exactly equal to each other.

As shown in (1), (2) and (3) in FIG. 4, an electric current in a predetermined direction is applied to the U-phase, the V-phase and the W-phase in turns. After that, as shown in (4), (5) and (6) in FIG. 4, an electric current in the opposite direction is applied to the U-phase, the V-phase and the W-phase in turns. According to the above excitation, the cylindrical element 23 linearly moves ⅙ of the pitch τ by every step, and moves one pitch τ by six steps.

According to the first embodiment, since the cylindrical element has the permanent magnets, the distribution of the magnetic flux draws a sine wave, which keeps high positioning accuracy and lowers vibration. In addition, while the armature is fixed and the cylindrical element moves linearly in the above description, the cylindrical element may be fixed and the armature may moves linearly with the housing.

Second Embodiment

Figure 5:
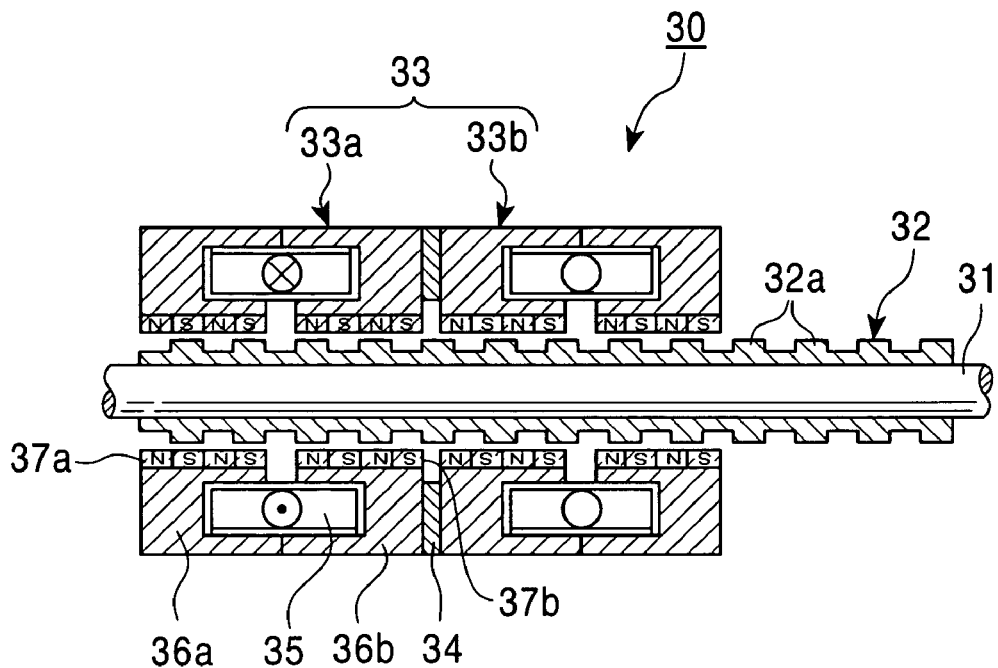
FIG. 5 is a sectional view of a toroidal-coil two-phase linear stepping motor according to a second embodiment.
Figure 6:
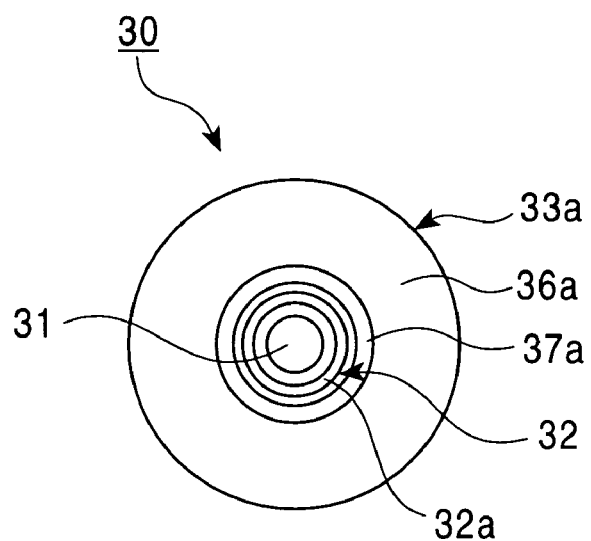
FIG. 6 is a front view of the motor in FIG. 5.

FIG. 5 is a sectional view of a toroidal-coil two-phase linear stepping motor 30 according to the second embodiment, and FIG. 6 is a front view of the motor 30. The toroidal-coil two-phase linear stepping motor 30 of the second embodiment is provided with an axis 31 fixed to a housing (not shown), a cylindrical element 32 that is supported by the axis 31 and an armature 33 that is fixed to the housing (not shown) around the cylindrical element 32 through an air gap in the radial direction. The cylindrical element 32 can linearly move along the axis 31. The magnetic structure of the cylindrical element 32 has toroidal magnetic teeth 32a that are formed on the outer surface by alternately repeating projections and depressions in the axial direction. Further, the cylindrical element 32 is provided with bearings (not shown) in the same manner as the first embodiment.

Still further, the armature 33 consists of a pair of armature units 33a, 33b arranged in the axial direction and a non-magnetic substance 34 sandwiched between the armature units 33a and 33b. The armature unit 33a has a toroidal coil 35, a pair of armature yokes 36a and 36b. The armature yokes 36a and 36b have toroidal permanent magnets 37a and 37b, respectively, that are attached to the inner surface thereof. The permanent magnets 37a and 37b are alternately magnetized in N pole and S pole in the axial direction so as to face the toroidal magnetic teeth 32a of the cylindrical element 32. The other armature unit 33b has the same construction as the armature unit 33a. That is, the motor of the second embodiment belongs to the group (1-2) in view of the magnetic circuit and belongs to the group (a) in view of the structure.

FIG. 5 shows a condition where the toroidal coil 35 of the armature unit 33a (the left side in FIG. 5) is excited. At the time, the magnetic force of the toroidal coil 35 weakens the magnetic flux of the N pole and enhances the magnetic flux of the S pole of the permanent magnet 37a arranged at the left side of the coil, and it weakens the magnetic flux of the S pole and enhances the magnetic flux of the N pole of the permanent magnet 37b arranged at the right side of the coil. As a result, the S pole of the permanent magnet 37a and the N pole of the permanent magnet 37b attract and correctly face the toroidal magnetic teeth 32a.

In the second embodiment, assuming that the pitch between the toroidal magnetic teeth 32a of the cylindrical element 32 having the same polarity is τ, the pitch of the permanent magnets 37a and 37b of each armature unit 33a and 33b is nearly equal to τ. Since P=2, when the permanent magnets of one armature unit 33a having a predetermined polarity correctly face the toroidal magnetic teeth 32a of the cylindrical element 32, the permanent magnets of the other armature unit 33b having the same polarity deviate from the toroidal magnetic teeth 32a of the cylindrical element 32 by τ/4. Assuming that τ=2π, the deviation is τ/2 that is a step moving amount.

Figure 7:
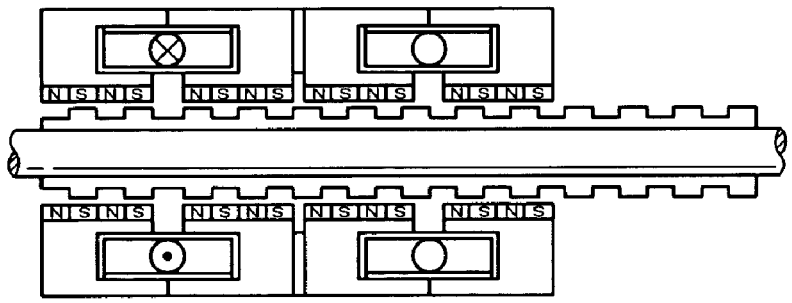
FIG. 7 shows movements of the motor in FIG. 5.
Figure 7:
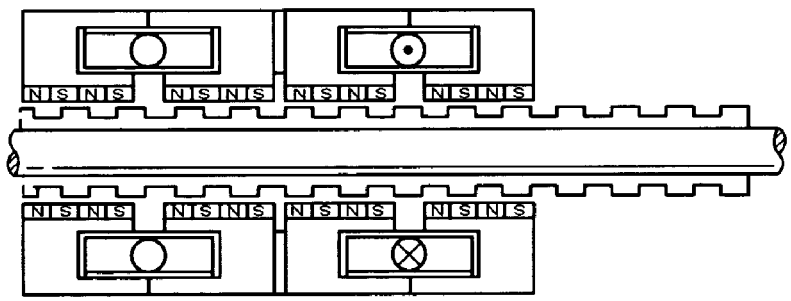
Figure 7:
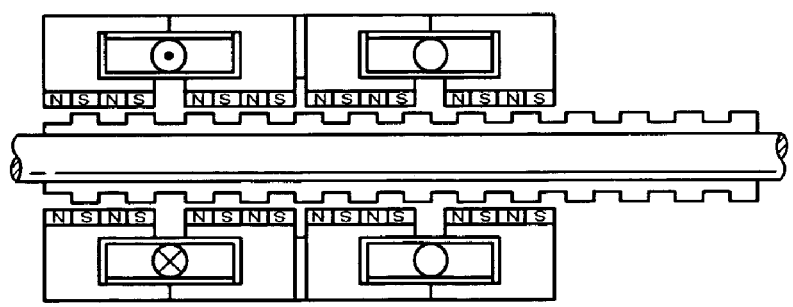
Figure 7:
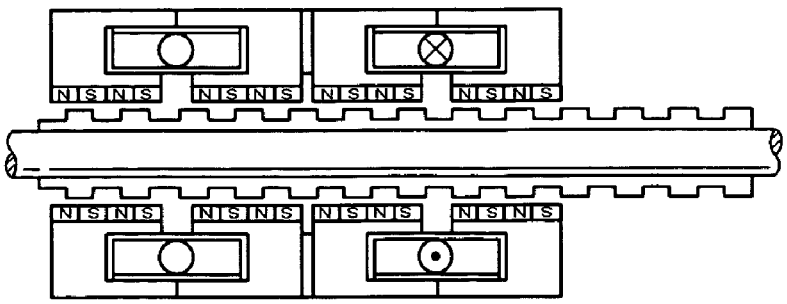

FIG. 7 shows the one cycle movement of the motor in the second embodiment. As shown in FIG. 7, (1) an electric current in a predetermined direction is applied to the left armature unit 36*a*, (2) an electric current in an opposite direction is applied to the right armature unit 36*b*, (3) an electric current in the opposite direction is applied to the left armature unit 36*a*, and (4) an electric current in the predetermined direction is applied to the right armature unit 36*b*. According to the above excitation, the cylindrical element 32 linearly moves ¼ of the pitch τ by every step, and moves one pitch τ by four steps.

Since the motor of the second embodiment uses permanent magnet, the motor has high positioning accuracy and low vibration as with the first embodiment. In addition, since the usage of the permanent magnet, which is more expensive than magnetic material such as iron, in the second embodiment is smaller than the first embodiment, the entire cost of the motor can be reduced. Further, while the armature is fixed and the cylindrical element moves linearly in the second embodiment, the cylindrical element may be fixed and the armature may moves linearly with the housing.

Third Embodiment

Figure 8:
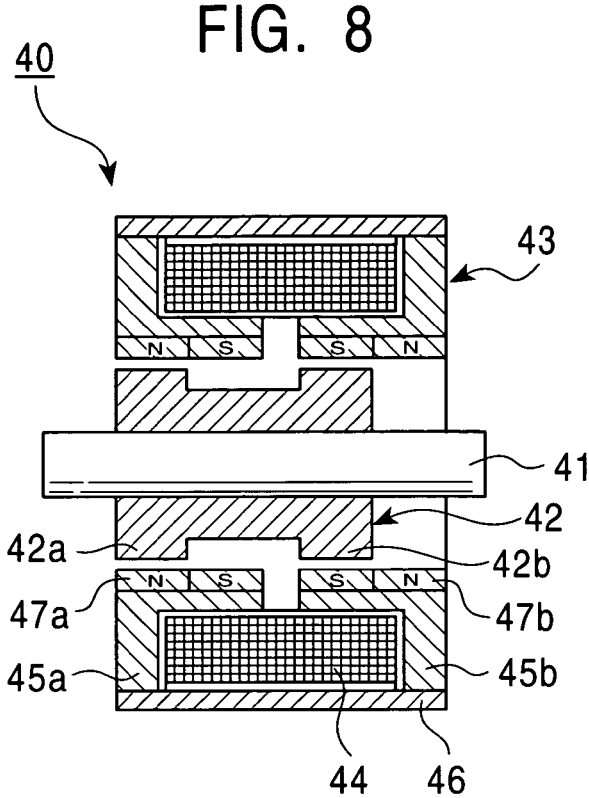
FIG. 8 is a sectional view of a toroidal-coil single-phase linear reciprocating motor according to a third embodiment.
Figure 9:
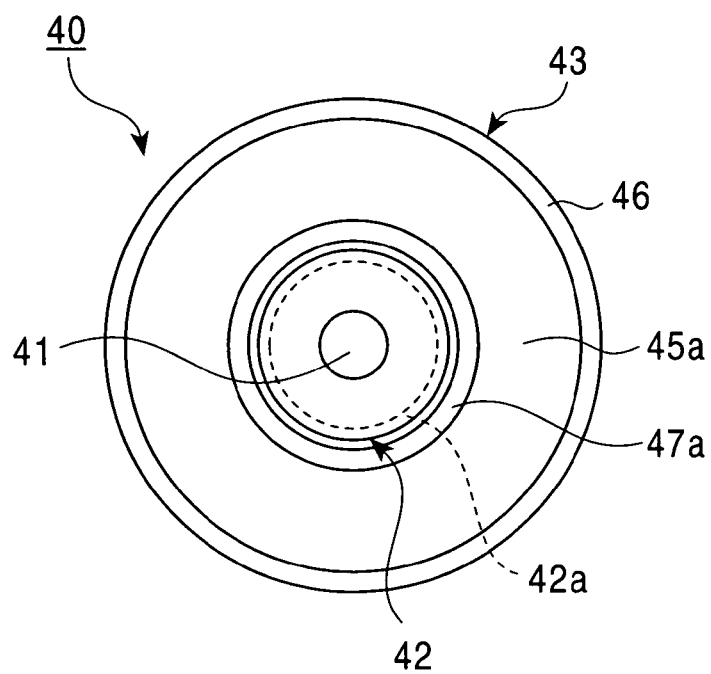
FIG. 9 is a front view of the motor in FIG. 8.

FIG. 8 is a sectional view of a toroidal-coil single-phase linear reciprocating motor 40 according to the third embodiment, and FIG. 9 is a front view of the motor 40. The toroidal-coil single-phase linear reciprocating motor 40 of the third embodiment is provided with an axis 41 that is supported by a housing (not shown), a cylindrical element 42 fixed to the axis 41 and an armature 43 that is fixed to the housing (not shown) around the cylindrical element 42 through an air gap in the radial direction. The axis 41 can linearly reciprocate with respect to the housing (not shown). The cylindrical element 42 is made from magnetic material and has a pair of toroidal magnetic teeth 42*a*, 42*b* at both ends to form as a spool. The housing of the motor in FIG. 8 can be constructed in the same manner as FIG. 10.

The armature 43 consists of a single armature unit, it has a toroidal coil 44, a pair of armature yokes 45*a*, 45*b* with flanges that hold the toroidal coil 44, and a cylindrical yoke 46 that covers the outer surface of the toroidal coil 44 and contacts the armature yokes 45*a*, 45*b*. The inner side of each of the armature yokes 45*a*, 45*b* is formed to wrap around the inner side of the toroidal coil 44. Further, the armature yoke 45*a* has a pair of permanent magnets 47*a* on the inner surface thereof. The permanent magnet 47*a* consists of N pole that is magnetized in the radial direction around the entire area and S pole that is similarly magnetized and is adjacent to the N pole in the axial direction. The N pole and the S pole of the permanent magnets 47*a* can face the toroidal magnetic tooth 42*a*. The other armature yoke 45*b* has a pair of permanent magnets 47*b* on the inner surface thereof. The permanent magnets 47*b* also includes N pole and S pole arranged in the axial direction. The S pole and the N pole of the permanent magnets 47*b* can face the other toroidal magnetic teeth 42*b*. These permanent magnets 47*a* and 47*b* are arranged so that one toroidal magnetic tooth faces N pole of one pair of permanent magnets when the other toroidal magnetic tooth faces S pole of the other pair of permanent magnets.

When an electric current is applied to the toroidal coil 44 in a predetermined direction, the magnetic flux caused by the excited coil enhances the magnetic flux of the N pole and weakens the magnetic flux of the S pole of the permanent magnet 47*a*, while enhances the magnetic flux of the S pole and weakens the magnetic flux of the N pole of the permanent magnet 47*b*. As a result, the N pole of the permanent magnet 47*a* and the S pole of the permanent magnet 47*b* attract and correctly face the toroidal magnetic teeth 42*a* and 42*b* as shown in FIG. 8. On the other hand, when an electric current is applied to the toroidal coil 44 in the opposite direction, the magnetic flux caused by the excited coil enhances the magnetic flux of the S pole and weakens the magnetic flux of the N pole of the permanent magnet 47*a*, while enhances the magnetic flux of the N pole and weakens the magnetic flux of the S pole of the permanent magnet 47*b*. As a result, the S pole of the permanent magnet 47*a* and the N pole of the permanent magnet 47*b* attract the toroidal magnetic teeth 42*a* and 42*b*, which moves the cylindrical element 42 in the right direction in FIG. 8.

Therefore, applying an alternating current to the toroidal coil 44, the cylindrical element 42 reciprocates right and left (vibrates) with the axis 41. That is, the motor of the third embodiment belongs to the group (2-2) in view of the magnetic circuit and belongs to the group (b) in view of the structure.

Figure 10:
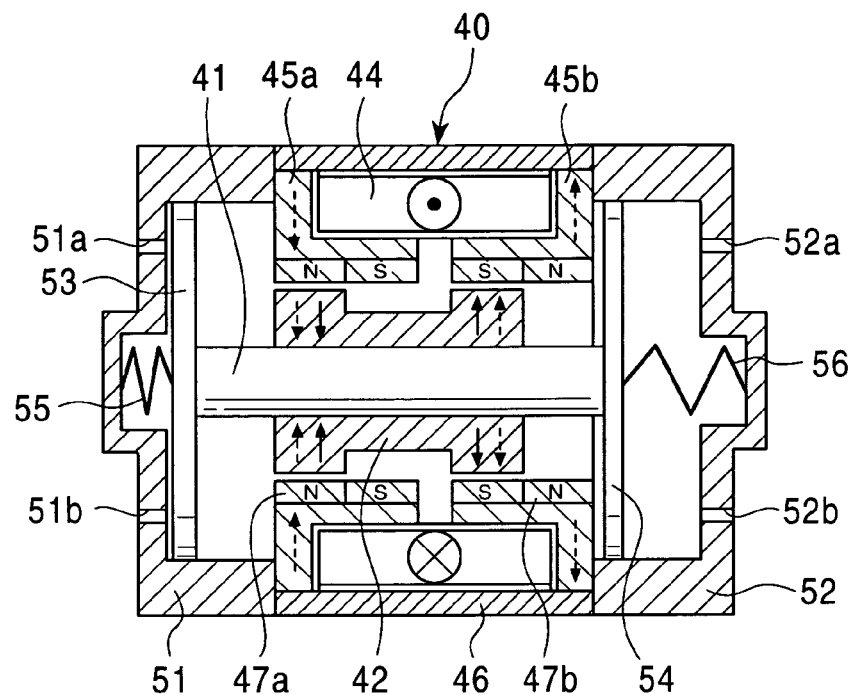
FIG. 10 is a sectional view of a cylinder compressor using the motor in FIG. 8 showing one moving condition.
Figure 11:
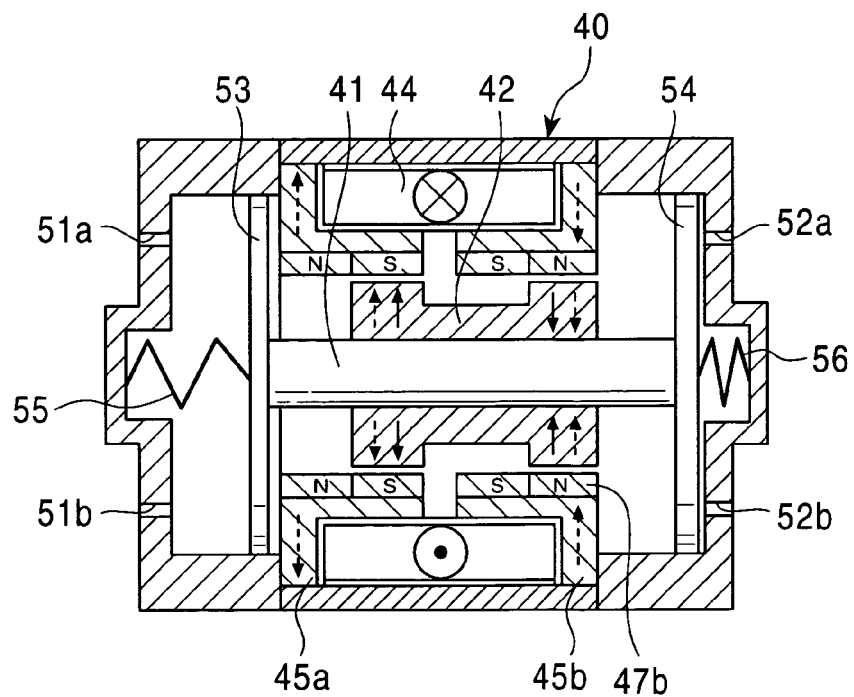
FIG. 11 is a sectional view of the cylinder compressor using the motor in FIG. 8 showing another moving condition.

FIG. 10 and FIG. 11 are sectional views showing moving conditions of a cylinder compressor employing the motor 40 of the third embodiment. The cylinder compressor is formed by attaching a first cylinder 51 and a second cylinder 52 to both sides of the motor 40 of the third embodiment in the axial direction.

In the example, the axis 41 and the cylindrical element 42 are fixed to each other to linearly move as a unit (that is, it belongs to the group (b) as well as the third embodiment), and a first piston 53 and a second piston 54, which reciprocate within the first and second cylinders 51 and 52, respectively, are attached to the respective ends of the axis 41.

The first and second cylinders 51, 52 have intake ports 51*a*, 52*a* and exhaust ports 51*b*, 52*b*, respectively. Each port has a valve to control intake and exhaust of gas. Further, springs 55, 56 are arranged between the pistons 53, 54 and the cylinders 51, 52, respectively.

As described above, the cylinder compressor has two compressor units at both sides of the linear motor and the pistons 53, 54 reciprocating within the cylinders 51, 52 have functions of bearings that guide the movable portion of the linear motor. Accordingly, since the motor is not required to have its own bearing, the entire compressor including the motor becomes compact.

Applying an alternating current to the toroidal coil 44, the cylindrical element 42 reciprocates between the position shown in FIG. 10 and the position shown in FIG. 11. Since the axis 41 moves together with the cylindrical element 42, the pistons 53, 54, which are attached to both ends of the axis 41, reciprocate within the cylinders 51, 52. That is, in the condition shown in FIG. 10, the electric current passing through the toroidal coil 44 in the indicated direction causes the coil magnetic flux as shown by the dotted line. The coil magnetic flux enhances the magnetic flux of the permanent magnets as shown by the solid line. As a result, the N pole of the permanent magnets 47*a* and the S pole of the permanent magnets 47*b* attract the toroidal magnetic teeth 42*a*, 42*b* of the cylindrical element 42. Then, gas in the first cylinder 51 is compressed and discharged through the exhaust port 51*b*, while the second cylinder 52 takes in gas through the intake port 52*a*. At the time, the intake port 51*a* and the exhaust port 52*b* are closed.

Next, when the direction of the electric current is switched, the compressor changes to the condition shown in FIG. 11. During the change of the condition, the first cylinder 51 takes in gas through the intake port 51*a*, while the second cylinder 52 compresses and discharges gas through the exhaust port 52*b*. At the time, the exhaust port 51*b* and the intake port 52*a* are closed.

An air conditioner can be constructed by attaching an evaporator to the cylinder compressor in FIGS. 10 and 11. The evaporator rapidly expands the gas compressed by the compressor to cool the gas. The air conditioner absorbs heat of surrounding air by the cooled gas to cool the surrounding air. The construction shown in FIGS. 10 and 11 can be used as a pump for conveying liquid. In addition, while the springs 55, 56 are arranged between the pistons 53, 54 and the cylinders 51, 52 in FIGS. 10 and 11, they may be arranged between the pistons 53, 54 and the stator portion of the motor (the armature 43, for example).

Frequency of the applied alternating current is preferably adjusted to resonant frequency by means of an inverter or the like in consideration of spring constant of the springs 55, 56 and inertia of the moving portion. When the frequency of the alternating current is equal to the resonant frequency, the pistons cause resonance, which increases efficiency of the compressor. In general, since the single-phase motor has a single magnetic flux vector, the efficiency thereof is higher than that of the multi-phase motor. Further, manufacturing cost of the single-phase motor is lower than the multi-phase motor because of its simple construction.

Figure 12:
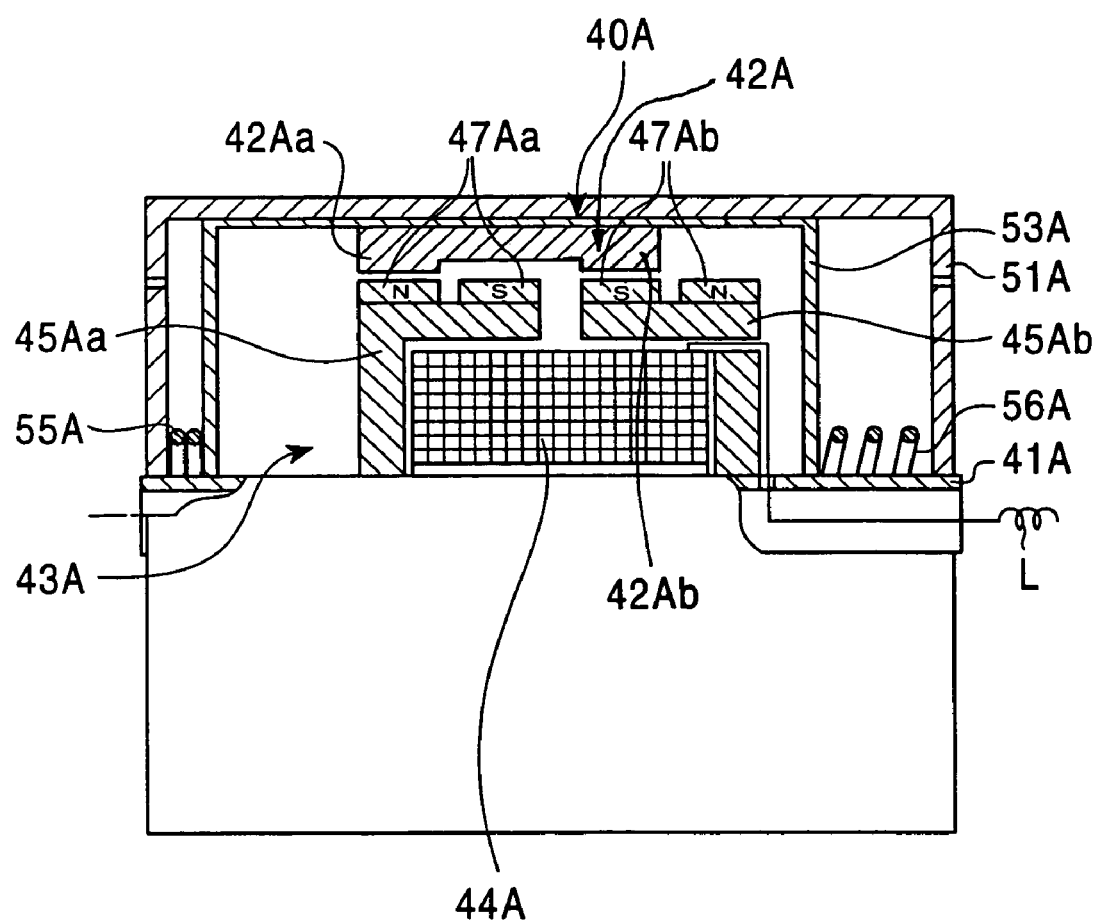
FIG. 12 is a sectional view of a cylinder compressor that is a variation of the applied example of the third embodiment.

FIG. 12 is a sectional view of a cylinder compressor that is a variation of the cylinder compressor in FIGS. 10 and 11. The motor 40A employed in this example belongs to the group (2-2) in view of the magnetic circuit as well as the third embodiment, while it belongs to the group (d) in view of the structure. That is, an armature 43A is fixed to a hollow axis 41A, and a cylindrical element 42A is arranged around the armature 43A. The hollow axis 41A is fixed to a cylinder case 51A at both ends, and the cylindrical element 42A is fixed to the inner surface of a piston case 53A that has a function of the housing. The piston case 53A can reciprocate within the cylinder case 51A. Both of the cylinder case 51A and the piston case 53A are formed as cylinders with circular bottom walls at both sides. Coil springs 55A, 56A wind around the hollow axis 41A at the positions between the bottom walls of the cylinder case 51A and the bottom walls of the piston case 53A.

The armature 43A has a toroidal coil 44A and a pair of armature yokes 45Aa, 45Ab that hold the toroidal coil 44A. A lead line L that applies an electric current to the toroidal coil 44A is wired through the inner space of the hollow axis 41A. The armature yoke 45Aa has permanent magnets 47Aa that consists of N pole and S pole on the outer surface thereof, and the armature yoke 45Ab has permanent magnets 47Ab that consists of N pole and S pole on the outer surface thereof. The cylindrical element 42A has a pair of toroidal magnetic teeth 42Aa, 42Ab, which are inwardly projected, at both ends in the axial direction. These permanent magnets 47Aa and 47Ab are arranged so that one toroidal magnetic tooth faces N pole of one pair of permanent magnets when the other toroidal magnetic tooth faces S pole of the other pair of permanent magnets.

Further, the intake port and the exhaust port are formed on both of the bottom walls of the cylinder case 51A in the same manner as that in FIGS. 10 and 11. Each port has a valve to control intake and exhaust of gas.

As described above, the cylinder compressor has two compressor units at both sides of the linear motor. Further, the piston case 53A reciprocating within the cylinder case 51A has a function of the bearing that guides the movable portion of the linear motor. Accordingly, since the motor is not required to have its own bearing, the entire compressor including the motor becomes compact.

Applying an alternating current to the toroidal coil 44A, the cylindrical element 42A reciprocates. Since the piston case 53A is fixed to the cylindrical element 42A, the piston case 53A reciprocates within the cylinder case 51A. That is, in the condition shown in FIG. 12, the coil magnetic flux caused by the electric current passing through the toroidal coil 44A in the indicated direction enhances the magnetic flux of the N pole of the permanent magnets 47Aa and the S pole of the permanent magnets 47Ab. As a result, the N pole of the permanent magnets 47Aa and the S pole of the permanent magnets 47Ab attract the toroidal magnetic teeth 42Aa, 42Ab of the cylindrical element 42A, which moves the piston case 53A to the left side in FIG. 12. Then, gas in the left chamber between the cylinder case 51A and the piston case 53A is compressed and discharged through the exhaust port, while the right chamber between the cylinder case 51A and the piston case 53A takes in gas through the intake port.

When the direction of the electric current is switched, the S pole of the permanent magnets 47Aa and the N pole of the permanent magnets 47Ab attract the toroidal magnetic teeth 42Aa, 42Ab of the cylindrical element 42A, which moves the piston case 53A to the right side. Then, gas in the right chamber is compressed and discharged through the exhaust port, while the right chamber takes in gas through the intake port.

An air conditioner can be constructed by attaching an evaporator to the cylinder compressor in FIG. 12. Frequency of the applied alternating current is preferably adjusted to resonant frequency in consideration of spring constant of the springs 55A, 56A and inertia of the moving portion. When the frequency of the alternating current is equal to the resonant frequency, the pistons cause resonance, which increases efficiency of the compressor.

Fourth Embodiment

Figure 13:
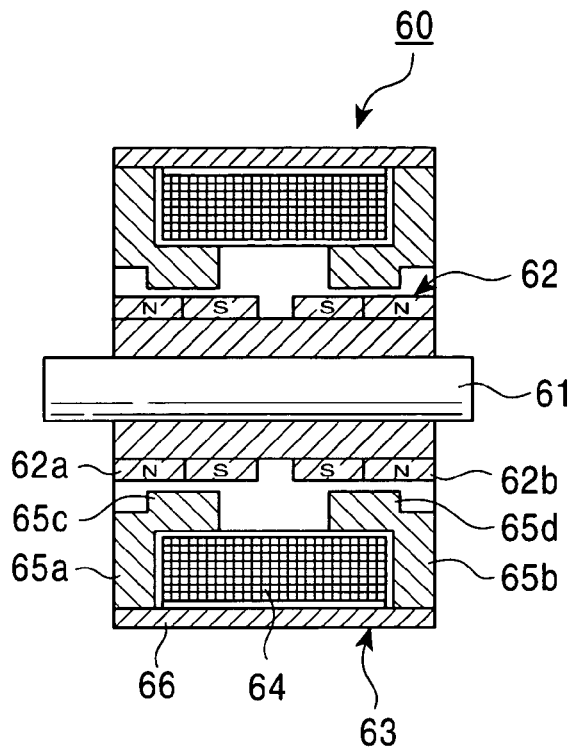
FIG. 13 is a sectional view of a toroidal-coil single-phase linear reciprocating motor according to a fourth embodiment.
Figure 14:
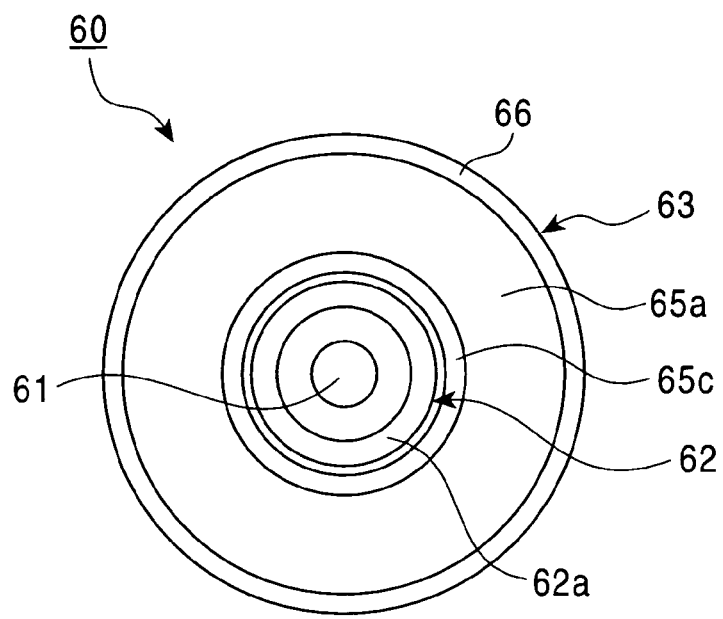
FIG. 14 is a front view of the motor in FIG. 13.

FIG. 13 is a sectional view of a toroidal-coil single-phase linear reciprocating motor 60 according to the fourth embodiment, and FIG. 14 is a front view of the motor 60. The toroidal-coil single-phase linear reciprocating motor 40 of the third embodiment is provided with an axis 61 that is supported by a housing (not shown), a cylindrical element 62 fixed to the axis 61 and an armature 63 that is fixed to the housing (not shown) around the cylindrical element 62 through an air gap in the radial direction. The axis 61 can linearly reciprocate with respect to the housing (not shown).

The armature 63 consists of a single armature unit, it has a toroidal coil 64, a pair of armature yokes 65a, 65b with flanges that hold the toroidal coil 64, and a cylindrical yoke 66 that covers the outer surface of the toroidal coil 64 and contacts the armature yokes 65a, 65b. The inner side of each of the armature yokes 65a, 65b is formed to wrap around the inner side of the toroidal coil 64. The armature yokes 65a has a single toroidal magnetic tooth 65c on the inner surface thereof and the armature yoke 65b has a single toroidal magnetic tooth 65d on the inner surface thereof. When the toroidal coil 64 is excited, the toroidal magnetic teeth 65c and 65d are magnetized in the opposite polarities.

The cylindrical element 62 is provided with a cylinder portion made from magnetic material around the axis 61 and two pairs of toroidal permanent magnets 62a and 62b arranged around the cylinder portion. The permanent magnets 62a, which can face one toroidal magnetic tooth 65c, consists of N pole and S pole arranged in the axial direction. The permanent magnets 62b, which can face the other toroidal magnetic tooth 65d, consists of S pole and N pole arranged in the axial direction. These permanent magnets 62a and 62b are arranged so that one toroidal magnetic tooth faces N pole of one pair of permanent magnets when the other toroidal magnetic tooth faces S pole of the other pair of permanent magnets. That is, the motor of the fourth embodiment belongs to the group (2-1) in view of the magnetic circuit and belongs to the group (a) in view of the structure.

When an electric current is applied to the toroidal coil 64 in a predetermined direction, the magnetic flux caused by the excited coil magnetizes the toroidal magnetic tooth 65*c* of one armature yoke 65*a* as N pole and the toroidal magnetic tooth 65*d* of the other armature yoke 65*b* as S pole. Therefore, the toroidal magnetic tooth 65*c* attracts the S pole of the permanent magnet 62*a* and the toroidal magnetic tooth 65*d* attracts the N pole of the permanent magnet 62*b*. As a result, the cylindrical element 62 and the axis 61 move to the left side from the neutral condition shown in FIG. 13.

On the other hand, when an electric current is applied to the toroidal coil 64 in the opposite direction, the magnetic flux caused by the excited coil magnetizes the toroidal magnetic tooth 65*c* of one armature yoke 65*a* as S pole and the toroidal magnetic tooth 65*d* of the other armature yoke 65*b* as N pole. Therefore, the toroidal magnetic tooth 65*c* attracts the N pole of the permanent magnet 62*a* and the toroidal magnetic tooth 65*d* attracts the S pole of the permanent magnet 62*b*. As a result, the cylindrical element 62 and the axis 61 move to the right side from the neutral condition shown in FIG. 13. Therefore, applying an alternating current to the toroidal coil 64, the cylindrical element 62 reciprocates right and left (vibrates) with the axis 61.

Fifth Embodiment

Figure 15:
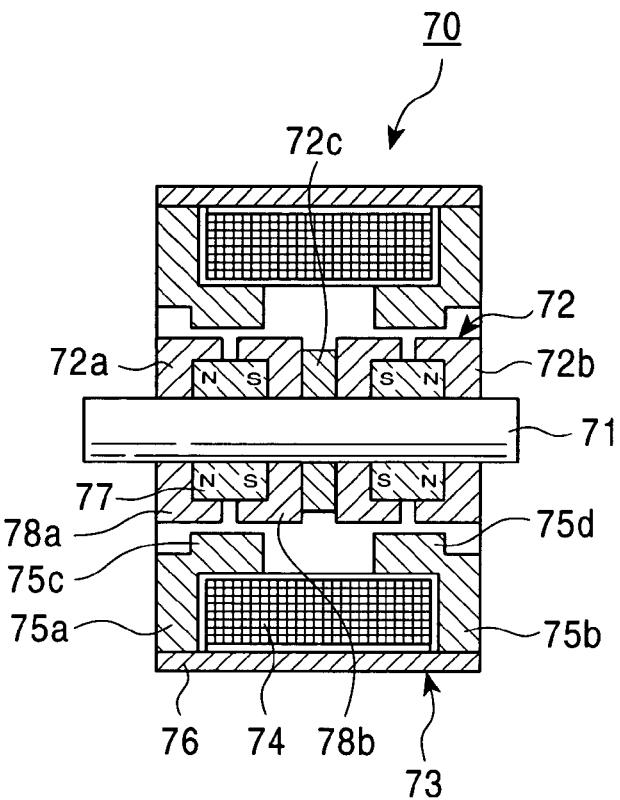
FIG. 15 is a sectional view of a toroidal-coil single-phase linear reciprocating motor according to a fifth embodiment.
Figure 16:
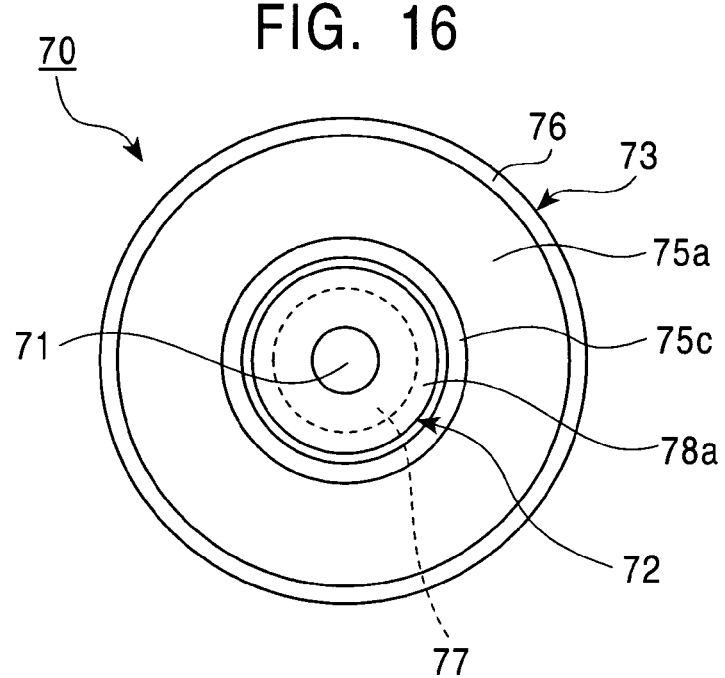
FIG. 16 is a front view of the motor in FIG. 15.

FIG. 15 is a sectional view of a toroidal-coil single-phase linear reciprocating motor 70 according to the fifth embodiment, and FIG. 16 is a front view of the motor 70. The toroidal-coil single-phase linear reciprocating motor 70 of the fifth embodiment is provided with an axis 71 that is supported by a housing (not shown), a cylindrical element 72 fixed to the axis 71 and an armature 73 that is fixed to the housing (not shown) around the cylindrical element 72 through an air gap in the radial direction. The axis 71 can linearly reciprocate with respect to the housing (not shown).

The armature 73 consists of a single armature unit, it has a toroidal coil 74, a pair of armature yokes 75*a*, 75*b* with flanges that hold the toroidal coil 74, and a cylindrical yoke 76 that covers the outer surface of the toroidal coil 74 and contacts the armature yokes 75*a*, 75*b*. The inner side of each of the armature yokes 75*a*, 75*b* is formed to wrap around the inner side of the toroidal coil 74. The armature yokes 75*a* has a single toroidal magnetic tooth 75*c* on the inner surface thereof and the armature yoke 75*b* has a single toroidal magnetic tooth 75*d* on the inner surface thereof. When the toroidal coil 74 is excited, the toroidal magnetic teeth 75*c* and 75*d* are magnetized in the opposite polarities.

The cylindrical element 72 has first and second HB type moving units 72*a*, 72*b* and a magnetic substance 72*c* arranged between the moving units. The moving units 72*a*, 72*b* and the magnetic substance 72*c* are fixed to the axis 71 so that they can reciprocate with the axis with respect to the housing (not shown). The first moving unit 72*a* consists of a permanent magnet 77 magnetized in S pole and N pole in the axial direction and a pair of magnetic poles 78*a*, 78*b* sandwiching the permanent magnet 77 from both sides in the axial direction. The second moving unit 72*b* has the same construction as the first moving unit 72*a*. The first and second moving units 72*a*, 72*b* are arranged so that one toroidal magnetic tooth 75*c* faces the magnetic pole contacting N pole of one moving unit when the other toroidal magnetic tooth 75*d* faces the magnetic pole contacting S pole of the other moving unit. That is, the motor of the fifth embodiment belongs to the group (2-3) in view of the magnetic circuit and belongs to the group (b) in view of the structure.

Figure 17:
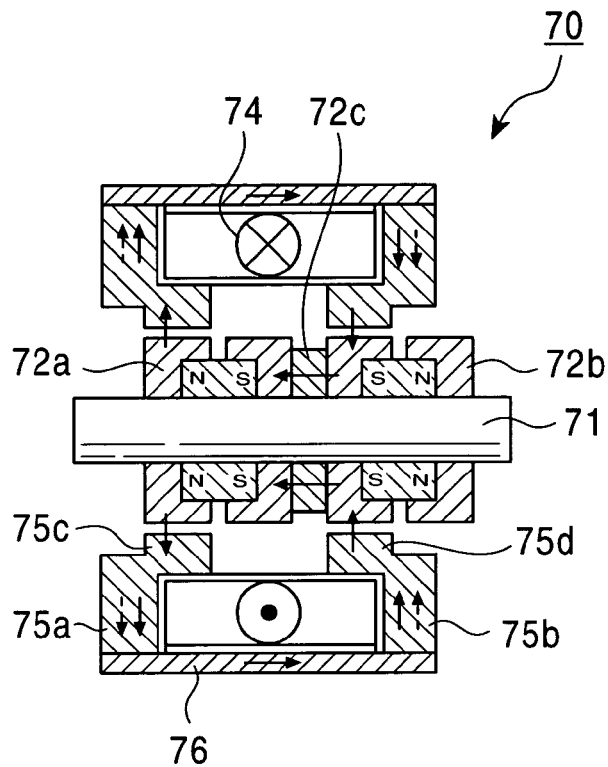
FIG. 17 shows one moving condition of the motor in FIG. 15.

When an electric current is applied to the toroidal coil 74 in a predetermined direction, the excited coil causes the magnetic flux as shown by the dotted line in FIG. 17, which magnetizes the toroidal magnetic tooth 75*c* of one armature yoke 75*a* as S pole and the toroidal magnetic tooth 75*d* of the other armature yoke 75*b* as N pole. Therefore, the toroidal magnetic tooth 75*c* attracts the magnetic pole of the first moving unit 72*a* contacting N pole, and the toroidal magnetic tooth 75*d* attracts the magnetic pole of the second moving unit 72*b* contacting S pole. As a result, the cylindrical element 72 and the axis 71 move to the right side from the neutral condition shown in FIG. 15 to the position shown in FIG. 17. The magnetic flux from the N pole to the S pole of the permanent magnet 77 of the first moving unit 72*a* forms a closed magnetic circuit passing through the armature yoke 75*a*, the cylindrical yoke 76, the other armature yoke 75*b*, the second moving unit 72*b*, the magnetic substance 72*c*, and returning to the S pole of the permanent magnet 77 as shown by the solid line in FIG. 17.

Figure 18:
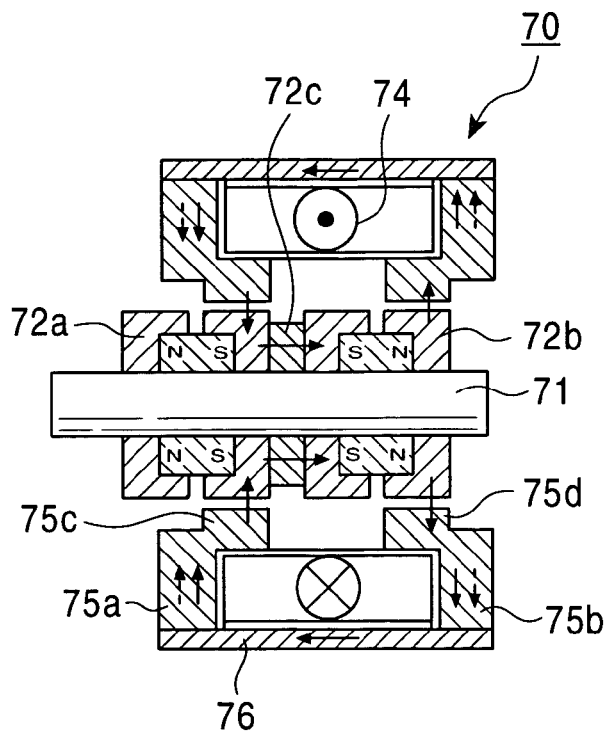
FIG. 18 shows another moving condition of the motor in FIG. 15.

On the other hand, when an electric current is applied to the toroidal coil 74 in the opposite direction, the excited coil causes the magnetic flux as shown by the dotted line in FIG. 18, which magnetizes the toroidal magnetic tooth 75*c* of one armature yoke 75*a* as N pole and the toroidal magnetic tooth 75*d* of the other armature yoke 75*b* as S pole. Therefore, the toroidal magnetic tooth 75*c* attracts the magnetic pole of the first moving unit 72*a* contacting S pole, and the toroidal magnetic tooth 75*d* attracts the magnetic pole of the second moving unit 72*b* contacting N pole. As a result, the cylindrical element 72 and the axis 71 move to the left side from the neutral condition shown in FIG. 15 to the position shown in FIG. 18. The magnetic flux from the N pole to the S pole of the permanent magnet 77 of the second moving unit 72*b* forms a closed magnetic circuit passing through the armature yoke 75*b*, the cylindrical yoke 76, the other armature yoke 75*a*, the first moving unit 72*a* and the magnetic substance 72*c* as shown by the solid line in FIG. 18.

Therefore, applying an alternating current to the toroidal coil 74, the cylindrical element 72 reciprocates right and left (vibrates) with the axis 71. Since the motor of the fifth embodiment employs the HB type cylindrical element, the magnetic flux density from the permanent magnet is higher than that of the PM type cylindrical element as shown in the fourth embodiment. Therefore, the motor of the fifth embodiment is insensitive to reaction of the armature (demagnetization of the permanent magnet) caused by the coil current.

Further, the motor 60 of the fourth embodiment or the motor 70 of the fifth embodiment can be used as the driving source of the cylinder compressor shown in FIG. 10 as well as the motor of the third embodiment. In such a case, pistons are attached to both ends of the axis 61 (71) that is fixed to the cylindrical element 62 (72) to drive a compressor or a pump in the same manner as FIG. 10.

Sixth Embodiment

Figure 19:
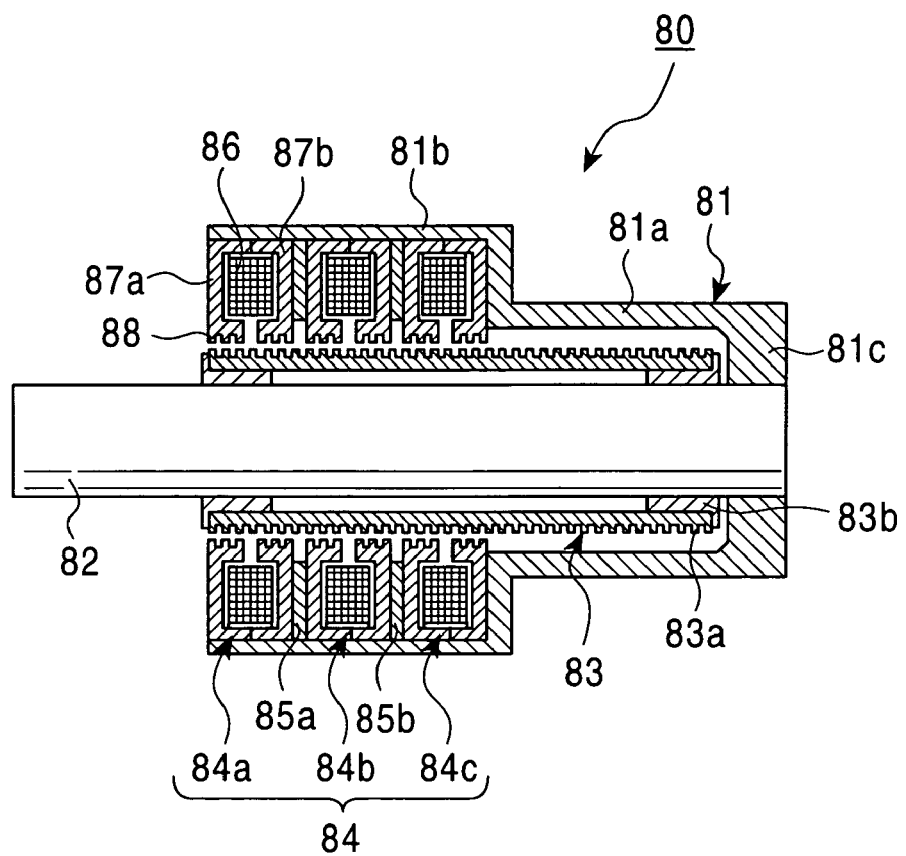
FIG. 19 is a sectional view of a toroidal-coil three-phase linear stepping motor.
Figure 20:
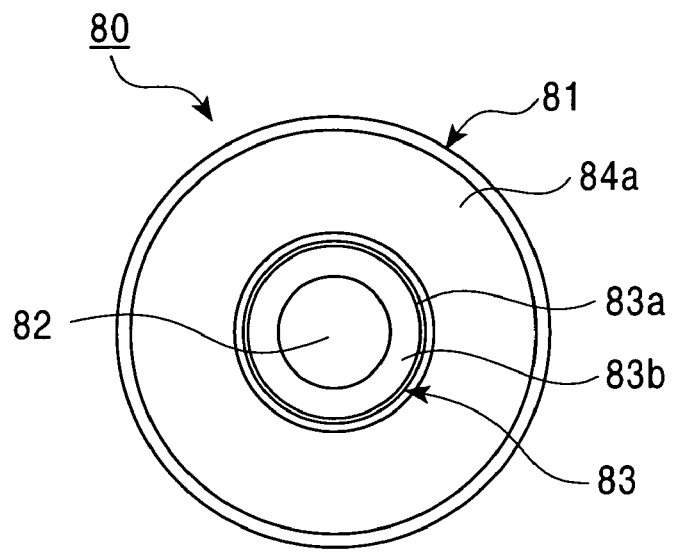
FIG. 20 is a front view of the motor in FIG. 19.

FIG. 19 is a sectional view of a toroidal-coil three-phase linear stepping motor 80 according to the sixth embodiment, and FIG. 20 is a front view of the motor 80. The toroidal-coil three-phase linear stepping motor 80 of the sixth embodiment is provided with a cylindrical housing 81 that consists of a small-diameter portion 81a and a large-diameter portion 81b connected to each other, an axis 82 coaxially arranged inside the housing 81, a cylindrical element 83 that is supported by the axis 82 and an armature 84 that is fixed to the housing 81 around the cylindrical element 83 through an air gap in the radial direction. The cylindrical element 83 can linearly move along the axis 82.

The axis 82 is inserted and fixed into a holding hole formed on a bottom wall 81c that stops up the end of the small-diameter portion 81a of the housing 81. The cylindrical element 83 has toroidal magnetic teeth 83a that are formed on the outer surface by alternately repeating projections and depressions in the axial direction. The cylindrical element 83 also has a pair of bearings 83b at both ends thereof.

The armature 84 consists of three armature units 84a, 84b and 84c arranged around the axis 82, and non-magnetic substances 85a and 85b arranged between the respective armature units. The armature unit 84a has a toroidal coil 86 that is wound around the axial line, and a pair of armature yokes 87a and 87b that hold the toroidal coil 86. The other armature units 84b and 84c have the same structure as the armature unit 84a. The armature yokes 87a and 87b are formed so that they cover the toroidal coil 86 at the inner side and the outer side.

Each of the armature yokes 87a and 87b has three toroidal magnetic teeth 88 on its inner surface. The toroidal magnetic teeth 88 are projecting portions formed by alternately repeating projections and depressions, and they are annularly formed along the inner surfaces of the armature yokes 87a and 87b. The toroidal magnetic teeth 88 of one armature yoke 87a and the toroidal magnetic teeth 88 of the other armature yoke 87b are magnetized in opposite polarities when the toroidal coil 87 is excited. That is, the motor of the first embodiment belongs to the group (1-3) in view of the magnetic circuit and belongs to the group (a) in view of the structure.

According to the above construction, when the toroidal coils 86 are excited, the magnetic force acted between the armature 84 and the magnetic structure (the toroidal magnetic teeth 83a) of the cylindrical element 83 linearly moves the cylindrical element 83 along the axis 82. Since the armature 84 employs the toroidal coils, the structure of the armature is simple. Further, since the cylindrical element 83 faces the armature 84 in 360 degrees, the side pull is canceled, which enables a smooth linear movement of the cylindrical element along the axis because of the extremely small load on the bearings in the radial direction. Therefore, it is unnecessary to use a guide mechanism such as a linear guide to keep an air gap, which can provide an inexpensive linear stepping motor.

Figure 21:
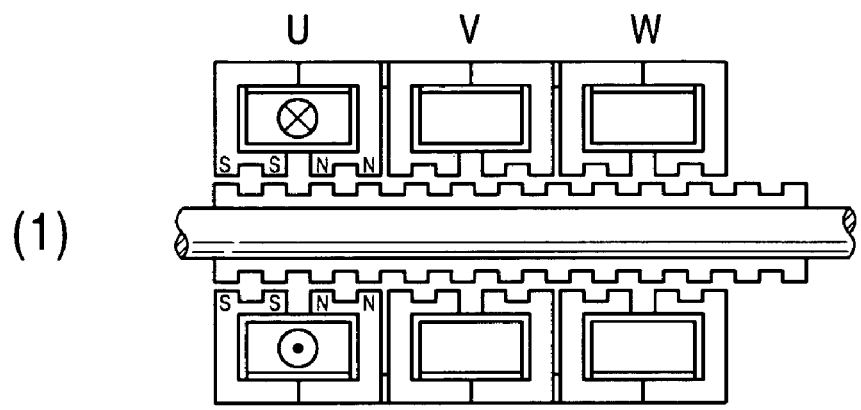
FIG. 21 shows movements of the motor in FIG. 19.
Figure 21:
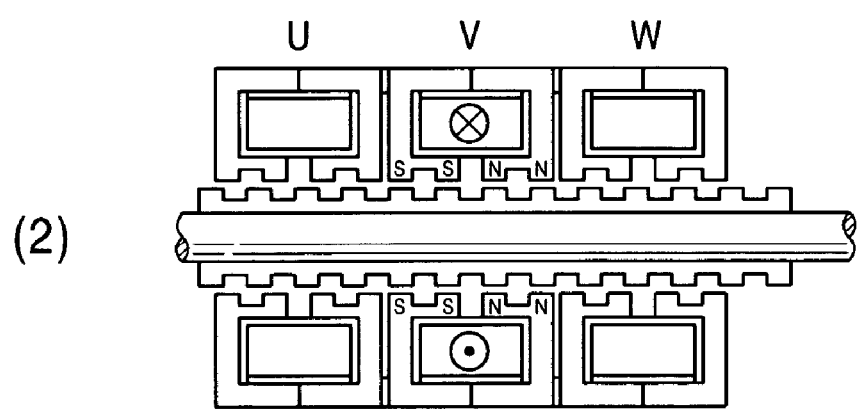
Figure 21:
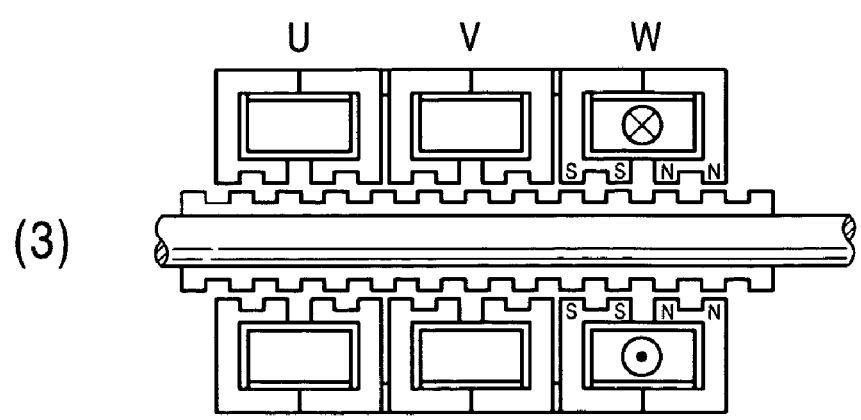

Next, detail magnetic constructions and movement of the toroidal-coil three-phase linear stepping motor 80 in the sixth embodiment will be described. FIG. 21 shows the movement of the motor of the sixth embodiment. The armature consists of three phases, U-phase, V-phase and W-phase. Actually, three toroidal coils may be connected as a star connection or a delta connection to be driven by multi-phase drive. However, the following description shows single-phase drive for the purpose of avoiding complication of the illustration.

Assuming that the pitch of the toroidal magnetic teeth of the cylindrical element is τ, the pitch of the toroidal magnetic teeth of the each armature unit being nearly equal to τ. FIG. 21 (1) shows the condition where the coil of the U-phase is excited. Therefore, the toroidal magnetic teeth of the armature unit of the U-phase are magnetized and they attract and face the toroidal magnetic teeth of the cylindrical element. At the time, the toroidal magnetic teeth of the armature unit of the V-phase deviate from the toroidal magnetic teeth of the cylindrical element by τ/P, and the toroidal magnetic teeth of the armature unit of the W-phase deviate from the toroidal magnetic teeth of the cylindrical element by 2τ/P. In the sixth embodiment, since P=3, assuming that τ=2π, the deviation of the V-phase is 2π/3, that of the W-phase is 4π/3. The amount x/P becomes a step moving amount. That is, the step moving amount of the two-phase motor is ½ of the pitch τ, and the step moving amount of the three-phase motor is ⅓ of the pitch τ.

As shown in (1), (2) and (3) in FIG. 21, when an electric current in a predetermined direction is applied to the U-phase, the V-phase and the W-phase in turns, the cylindrical element 83 linearly moves ⅓ of the pitch τ by every step, and moves one pitch τ by three steps.

Basically, the pitch of the toroidal magnetic teeth formed on the armature yoke is determined to be identical to the pitch of the toroidal magnetic teeth formed on the cylindrical element. However, the pitches may be set different in order to weaken the cogging torque.

Since the motor of the sixth embodiment does not use permanent magnets, the cost of the motor can be reduced while the torque decreases.

Figure 22:
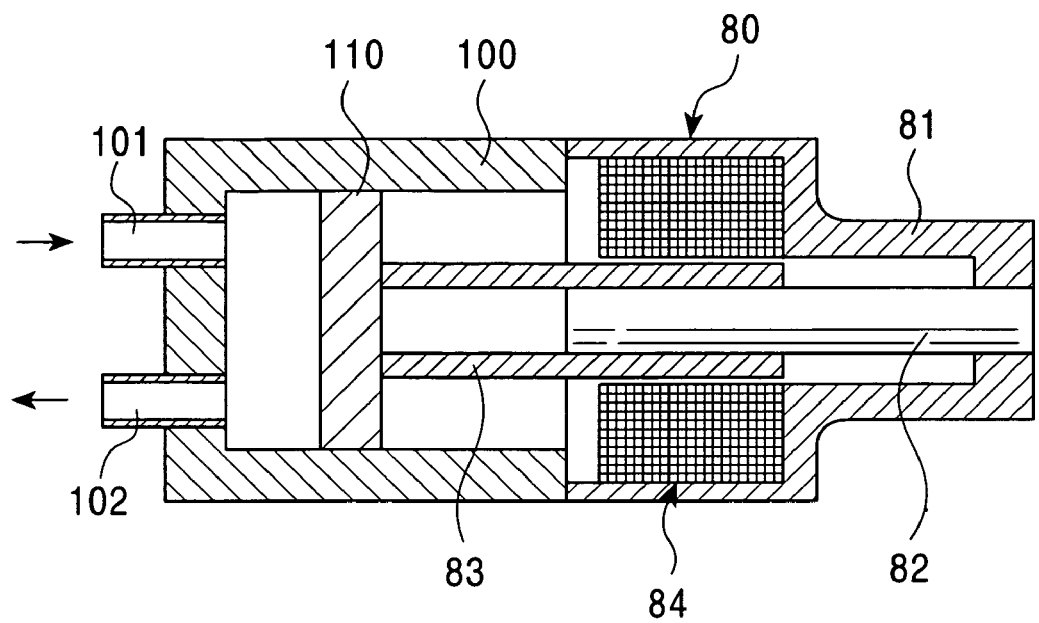
FIG. 22 is a sectional view of a cylinder compressor using the motor of the sixth embodiment.

FIG. 22 is a sectional view of a cylinder compressor employing the toroidal-coil three-phase linear stepping motor 80 of the sixth embodiment. The motor 80 has the housing 81, the axis 82, the cylindrical element 83 and the armature 84. In FIG. 22, the motor 80 is illustrated in the simplified form. A cylinder 100 is coaxially fixed to the motor 80 and a piston 110 is attached to the end of the cylindrical element 83. Driving the motor 80 to linearly move the cylindrical element 83, the piston 110 reciprocates within the cylinder 100. Further, the cylinder 100 has an intake port 101 and an exhaust port 102. The intake port 101 has a valve (not shown) that opens during an intake process when the piston 110 moves to right side to pass gas in a direction of the arrow and closes during a compression process when the piston 110 moves to left side. The exhaust port 102 also has a valve (not shown) that closes during the intake process and opens when the pressure exceeds a predetermined value in the compression process to pass gas in a direction of the arrow.

An air conditioner can be constructed by attaching an evaporator to the cylinder compressor in FIG. 22. In addition, since the housing of the motor 80 is cylindrical as well as the cylinder 100, these can be easily connected when the diameters of the housing and the cylinder are equated. Further, since the compressor in FIG. 22 directly drives the piston 110 by the linear motor 80, it dose not need a mechanism to convert a rotating movement into a linear movement that is necessary when a rotating motor is employed, which makes the compressor simple and compact. Still further, if a compression apparatus includes a plurality of compressors shown in FIG. 22 and phases of the driving cycles are changed to be different to each other, the compression apparatus continuously supplies the compression gas to the evaporator, which stabilizes the cooling effect. The phases of the compressors can be easily changed by electrically controlling the phases of the linear motors. The compression ratio, which determines the output, is also easily adjusted by controlling the strokes of the linear motors.

Figure 29:
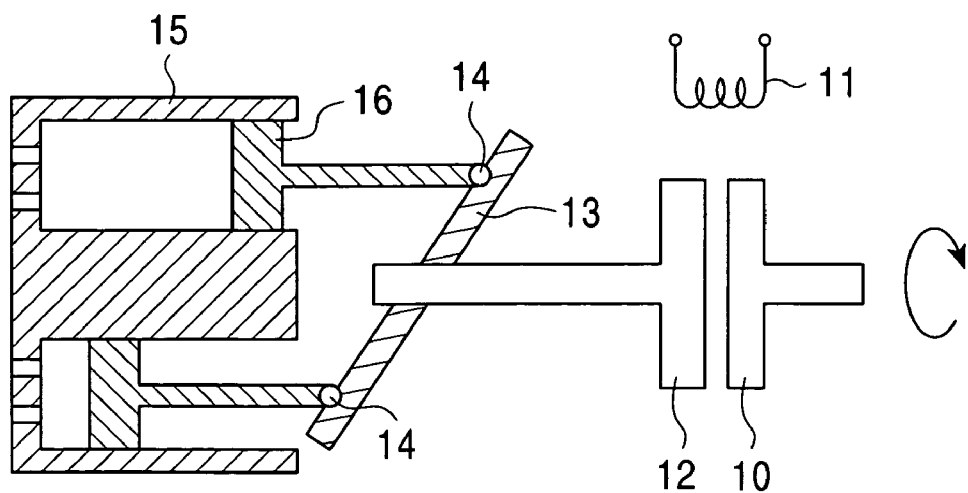
FIG. 29 is a block diagram showing a compressor of a conventional car's air conditioner.

Since the conventional compressor shown in FIG. 29 uses an engine power, it is not suitable to an electric vehicle. The electric compressor as shown in FIG. 22 is suitable to an electric vehicle.

In addition, while FIG. 22 shows the cylinder compressor employing the toroidal-coil three-phase linear stepping motor 80 of the sixth embodiment, the compressor can employ the motors of the other embodiments.

Seventh Embodiment

Figure 23:
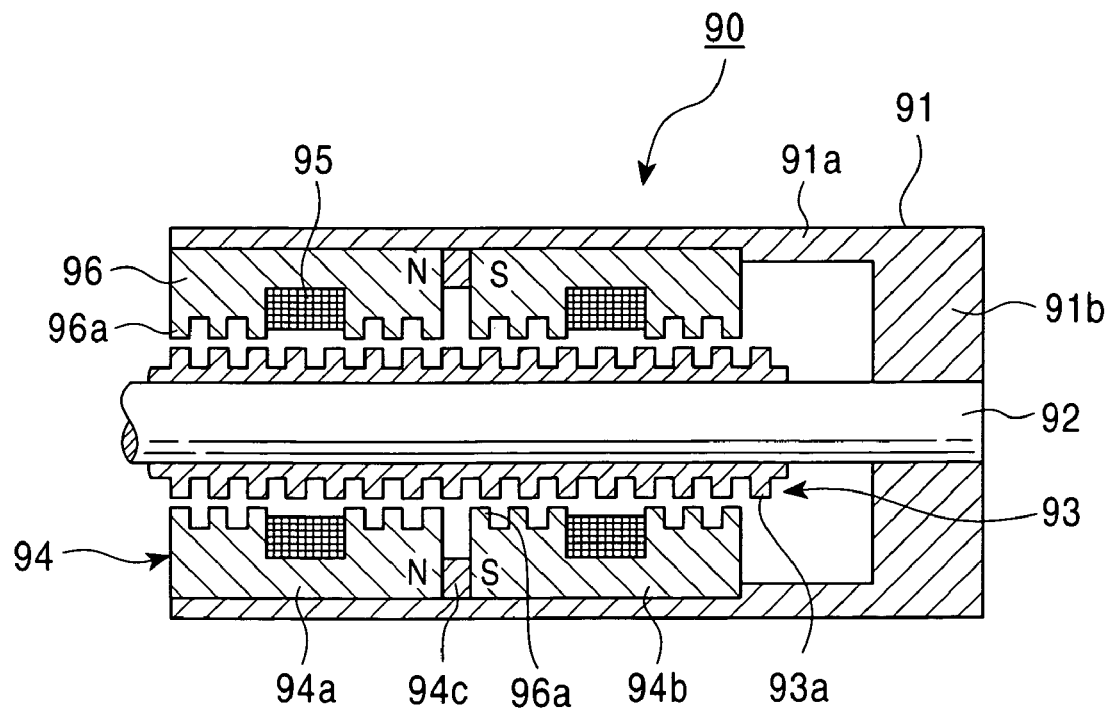
FIG. 23 is a sectional view of a toroidal-coil two-phase linear stepping motor according to a seventh embodiment.

FIG. 23 is a sectional view of a toroidal-coil two-phase linear stepping motor 90 according to the seventh embodiment. The motor 90 of the seventh embodiment is provided with a cylindrical housing 91 that consists of a cylinder portion 91a and a bottom wall 91b, an axis 92 coaxially arranged inside the hosing 91, the cylindrical element 93 that can linearly move along the axis 92 and an armature 94 fixed to the housing 91 around the cylindrical element 93 through an air gap in the radial direction.

The axis 92 is inserted and fixed into a holding hole formed on the bottom wall 91b of the housing 91. The cylindrical element 93 has toroidal magnetic teeth 93a that are formed on the outer surface by alternately repeating projections and depressions in the axial direction.

The armature 94 consists of first and second annular armature units 94a, 94b arranged around the axis 92 in the axial direction, and a permanent magnet 94c embedded between the armature units 94a, 94b. The armature unit 94a has a toroidal coil 95 that is wound around the axial line, and an armature yoke 96 that hold the toroidal coil 96. The armature yoke 96 is made from magnetic material.

The armature yoke 96 has toroidal magnetic teeth 96a on its inner surface so as to face the toroidal magnetic teeth 93a formed on the cylindrical element. Three toroidal magnetic teeth 96a are formed at one side of the toroidal coil 95 and three toroidal magnetic teeth 96a are formed at the other side of the toroidal coil 95. Further, when the toroidal magnetic teeth 96a at the left side of the toroidal coil 95 correctly face the toroidal magnetic teeth 93a of the cylindrical element 93, the toroidal magnetic teeth 96a at the right side of the toroidal coil 95 deviate from the toroidal magnetic teeth 93a by ½ pitch (face the depressions between the teeth). The second armature unit 94b has the same structure as the first armature unit 94a. Further, when the toroidal magnetic teeth 96a of one side of the first armature unit 94a correctly face the toroidal magnetic teeth 93a of the cylindrical element 93, the toroidal magnetic teeth 96a of the second armature unit 94b deviate from the toroidal magnetic teeth 93a of the cylindrical element 93 by ¼ pitch (face the boundaries between the teeth and the depressions).

Next, the movement of the motor 90 of the seventh embodiment will be described. The permanent magnet 94c is magnetized so that the left side is N pole and the right side is S pole in FIG. 23. Therefore, when the toroidal coil 95 is not excited, the toroidal magnetic teeth 96a of the first armature unit 94a are magnetized in N pole, and the toroidal magnetic teeth 96a of the second armature unit 94b are magnetized in S pole.

When an electric current is applied to the toroidal coil 95 of the first armature unit 94a in a predetermined direction, the coil magnetic flux of N pole occurs at the left side of the coil and the coil magnetic flux of S pole occurs at the right side of the coil. The three toroidal magnetic teeth 96a of the left half of the first armature unit 94a are strongly magnetized in N pole because the magnetic flux of the permanent magnet 94c is enhanced by the coil magnetic flux. On the other hand, the three toroidal magnetic teeth 96a of the right half of the first armature unit 94a are not magnetized because the magnetic flux of the permanent magnet 94c is canceled by the coil magnetic flux. As a result, the cylindrical element 93 moves to the position where the three toroidal magnetic teeth 96a of the left half of the first armature unit 94a face the toroidal magnetic teeth 93a of the cylindrical element 93. The magnetic flux from the N pole of the permanent magnet 94c forms a closed magnetic circuit passing through the toroidal magnetic teeth 96a of the first armature unit 94a, the toroidal magnetic teeth 93a of the cylindrical element 93 that face the teeth 96a, the toroidal magnetic teeth 96a of the second armature unit 94b that deviate by ¼ pitch, and returning to the S pole of the permanent magnet 94c.

At the next step, an electric current is applied to the toroidal coil 95 of the second armature unit 94b in the opposite direction. Then, the coil magnetic flux of S pole occurs at the left side and the coil magnetic flux of N pole occurs at the right side. The three toroidal magnetic teeth 96a of the left half of the second armature unit 94b are strongly magnetized in S pole because the magnetic flux of the permanent magnet 94c is enhanced by the coil magnetic flux. On the other hand, the three toroidal magnetic teeth 96a of the right half of the second armature unit 94b are not magnetized because the magnetic flux of the permanent magnet 94c is canceled by the coil magnetic flux. As a result, the cylindrical element 93 moves by ¼ pitch in the left side from the position shown in FIG. 23 to the position where the three toroidal magnetic teeth 96a of the left half of the second armature unit 94b face the toroidal magnetic teeth 93a of the cylindrical element 93.

As described above, the electric current is applied to the toroidal coil 95 of the first armature unit 94a in the predetermined direction at the first step, and the electric current is applied to the toroidal coil 95 of the second armature unit 94b in the opposite direction at the second step. In the same manner, the electric current is applied to the toroidal coil 95 of the first armature unit 94a in the opposite direction at the third step, and the electric current is applied to the toroidal coil 95 of the second armature unit 94b in the predetermined direction at the fourth step. According to the above excitation, the cylindrical element 93 linearly moves ¼ pitch by every step to the left side, and moves one pitch by four steps.

Since the armature 94 includes the permanent magnet 94c in the seventh embodiment, the magnetic flux generated on each toroidal magnetic tooth is higher than the sixth embodiment, which increases the torque.

Eighth Embodiment

Figure 24:
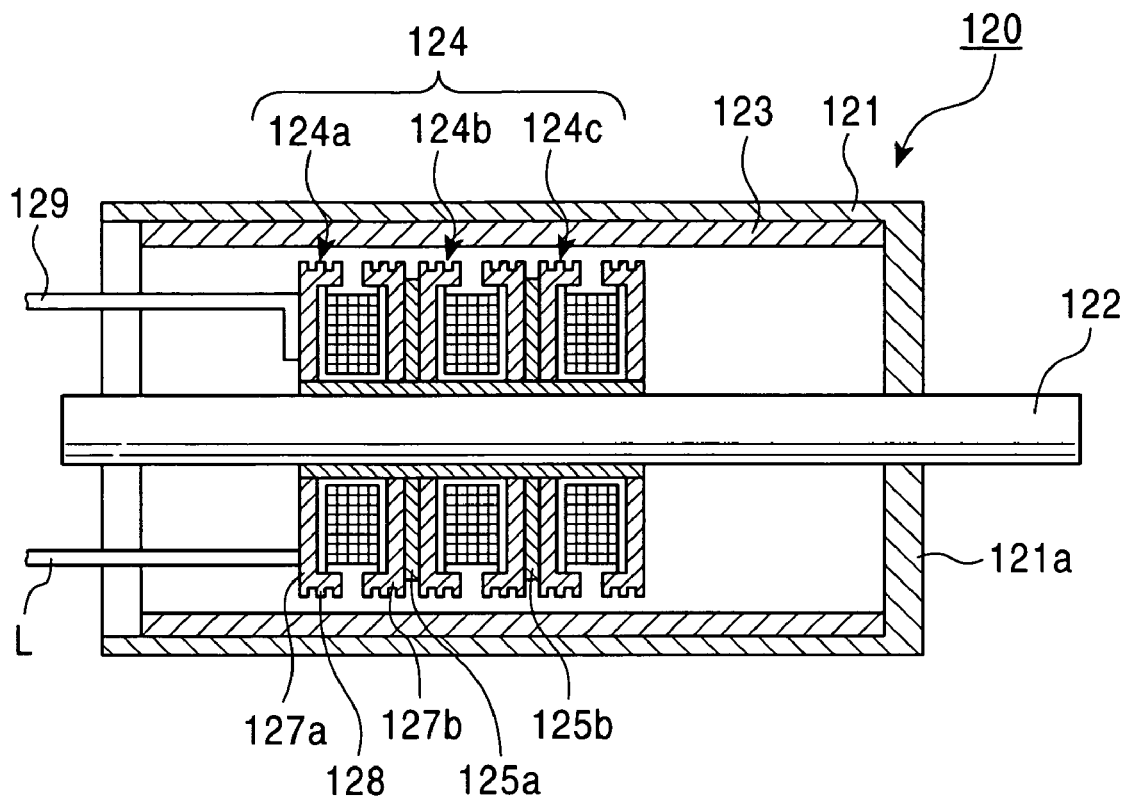
FIG. 24 is a sectional view of a toroidal-coil three-phase linear stepping motor according to an eighth embodiment.
Figure 25:
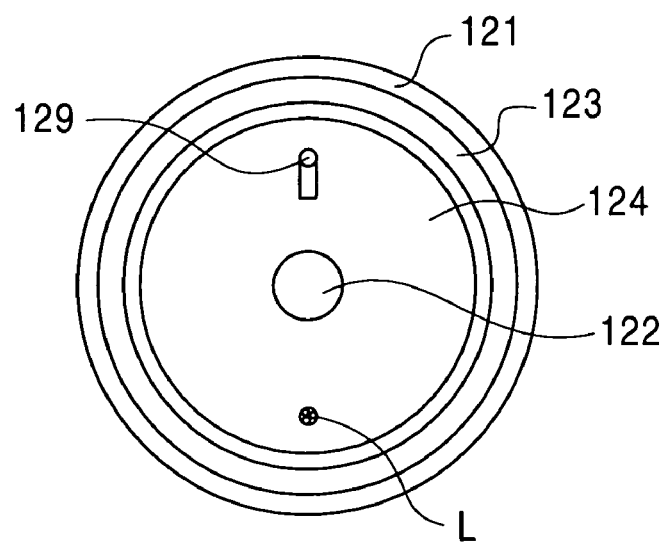
FIG. 25 is a front view of the motor in FIG. 24.

FIG. 24 is a sectional view of a toroidal-coil three-phase linear stepping motor 120, and FIG. 25 is a front view of the motor 120. The toroidal-coil three-phase linear stepping motor 120 of the eighth embodiment is provided with a cylindrical housing 121, an axis 122 that is coaxially mounted in the housing 121, an armature 124 that is supported by the axis 122, and a cylindrical element 123 that is fixed to the housing 121 around the armature 124 through an air gap in the radial direction.

The axis 122 is inserted and fixed to a holding hole formed on a bottom wall 121a of the housing 121. The armature 124 can linearly move along the axis 122.

The armature 124 consists of three armature units 124a, 124b, 124c arranged in the axial direction around the axis 122, and non-magnetic substances 125a, 125b that are arranged between the respective armature units. The armature unit 124a has a toroidal coil 126 that is wound around the axial line, and a pair of armature yokes 127a and 127b that are made from magnetic material to hold the toroidal coil 126. The other armature units 124b and 124c have the same structure as the armature unit 124a. Each of the armature yokes 127a and 127b has three toroidal magnetic teeth 128 on its outer surface. The toroidal magnetic teeth 128 are projecting portions formed by alternately repeating projections and depressions, and they are annularly formed along the outer surfaces of the armature yokes 127a and 127b. The toroidal magnetic teeth 128 of one armature yoke 127a and the toroidal magnetic teeth 128 of the other armature yoke 127b are magnetized in opposite polarities when the toroidal coil 126 is excited.

The cylindrical element 123 has toroidal permanent magnets that are alternately magnetized in N pole and S pole in the axial direction. The arrangement of the permanent magnets is similar to the first embodiment shown in FIG. 3. That is, the motor of the eighth embodiment belongs to the group (1-1) in view of the magnetic circuit and belongs to the group (c) in view of the structure.

A drive arm 129 fixed to the armature 124 is projected from the opening of the housing 121. Further, a lead line L that supplies electricity to the toroidal coils 126 in the armature 124 is led from the opening of the housing 121.

The driving principal of the motor 120 of the eighth embodiment is identical to that of the first embodiment. Applying an electric current to the respective toroidal coils 126 of the armature 124 by turns, the armature 124 linearly moves along the axis 122. When an object is connected to the drive arm 129, the object can be moved linearly.

The motor of the eighth embodiment can simplifies the structure of the armature, can cancel the side pull and can linearly move the armature 124 smoothly along the axis 122. That is, the eighth embodiment has the similar effects to the first embodiment.

Further, since the motor of the eighth embodiment arranges the armature 124 having large thickness in the radial direction at the inside and the cylindrical element 123 having small thickness in the radial direction at the outside, the facing area between the armature and the cylindrical element becomes larger than the motor of the first embodiment on the precondition that the outer diameter is constant. Therefore, the motor of the eighth embodiment has a larger torque than the motor of the first embodiment.

Ninth Embodiment

Figure 26:
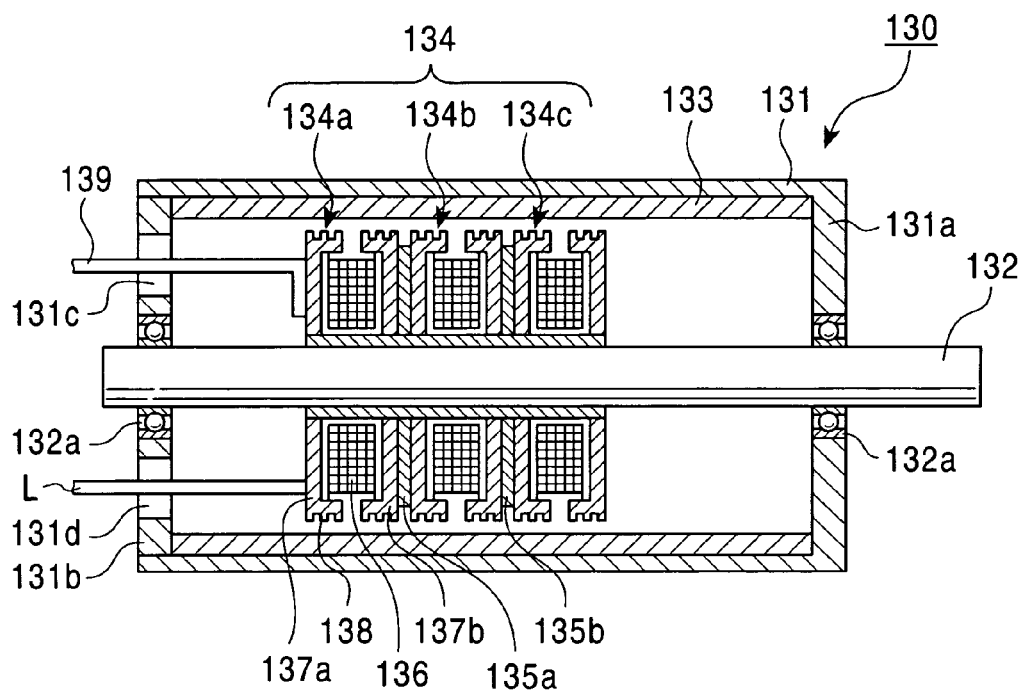
FIG. 26 is a sectional view of a toroidal-coil three-phase linear stepping motor according to a ninth embodiment.
Figure 27:
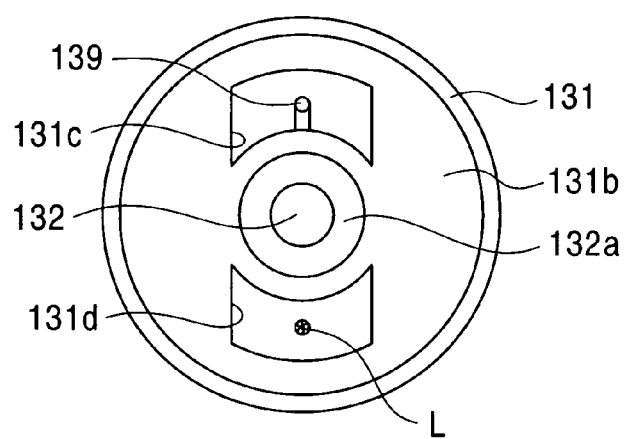
FIG. 27 is a front view of the motor in FIG. 26.
Figure 28:
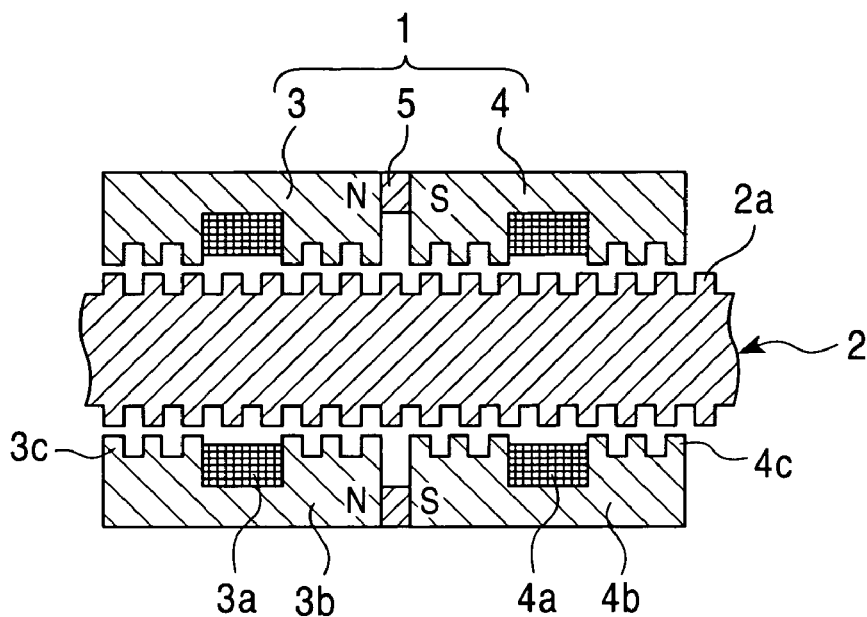
FIG. 28 is a sectional view of a conventional toroidal-coil two-phase linear stepping motor.

FIG. 26 is a sectional view of a toroidal-coil three-phase linear stepping motor 130 according to the ninth embodiment, and FIG. 27 is a front view of the motor 130. The toroidal-coil three-phase linear stepping motor 130 of the ninth embodiment is provided with a cylindrical housing 131, an axis 132 that is coaxially mounted in the housing 131, an armature 134 that is fixed to the axis 132, and a cylindrical element 133 that is fixed to the housing 131 around the armature 134 through an air gap in the radial direction. The axis 132 can linearly move with respect to the housing 131.

The axis 132 is supported by a pair of linear bearings 132a and 132a that are attached to a bottom wall 131a of the housing 131 and a bracket 131b that seals an opening of the housing 131, respectively. The armature 134 consists of three armature units 134a, 134b, 134c arranged in the axial direction around the axis 132, and non-magnetic substances 135a, 135b that are arranged between the respective armature units. The armature unit 134a has a toroidal coil 136 that is wound around the axial line, and a pair of armature yokes 137a and 137b that are made from magnetic material to hold the toroidal coil 136. The other armature units 134b and 134c have the same structure as the armature unit 134a. Each of the armature yokes 137a and 137b has three toroidal magnetic teeth 138 on its outer surface. The toroidal magnetic teeth 138 are projecting portions formed by alternately repeating projections and depressions, and they are annularly formed along the outer surfaces of the armature yokes 137a and 137b. The toroidal magnetic teeth 138 of one armature yoke 137a and the toroidal magnetic teeth 138 of the other armature yoke 137b are magnetized in opposite polarities when the toroidal coil 136 is excited.

The cylindrical element 133 has toroidal permanent magnets that are alternately magnetized in N pole and S pole in the axial direction. The arrangement of the permanent magnets is similar to the first embodiment shown in FIG. 3. That is, the motor of the ninth embodiment belongs to the group (1-1) in view of the magnetic circuit and belongs to the group (d) in view of the structure.

As shown in FIG. 27, a pair of through holes 131c and 131d are formed on the bracket 131b. A drive arm 139 fixed to the armature 134 extends through the upper through hole 131c and a lead line L that supplies electricity to the toroidal coils 136 in the armature 134 is led through the lower through hole 131d.

The driving principal of the motor 130 of the ninth embodiment is identical to that of the first embodiment shown in FIG. 4. Applying an electric current to the respective toroidal coils 136 of the armature 134 by turns, the armature 134 linearly moves with the axis 132. When an object is connected to the drive arm 139 or the axis 132, the object can be moved linearly.

The motor of the ninth embodiment can simplifies the structure of the armature, can cancel the side pull and can linearly move the armature 134 smoothly with the axis 122. That is, the eighth embodiment has the similar effects to the first embodiment. In addition, the motor of the ninth embodiment has a larger torque than the motor of the first embodiment as well as the eighth embodiment.

Further, various variations are conceivable based on the structure of the ninth embodiment. For example, the housing 131 and the cylindrical element 133 may linearly move along the fixed axis 132.

The multi-phase linear stepping motor can be used as a blushless linear motor by detecting relative position and/or relative moving speed between the armature and the cylindrical element to determine timing for exciting the toroidal coil of the next phase.

The toroidal-coil linear stepping motor and the toroidal-coil linear reciprocating motor of the present invention is also suitable to a driving source of a syringe pump as well as that of a compressor. Since a cylinder of a syringe pump is also cylindrical, the linear motor of the present invention that has a cylindrical housing can be easily connected to a syringe pump. Particularly, since the distribution of the magnetic flux of the linear stepping motor using the permanent magnets draws a sine wave, it is suitable to accurate liquid pumping by microstep driving.

Further, the toroidal-coil linear stepping motor and the toroidal-coil linear reciprocating motor of the present invention can be applied to an actuator for industrial devices such as a valve controller, a welding machine and a soldering robot, or for a medical apparatus, an automobile and an housing equipment.

What is claimed is:

1. A toroidal-coil linear reciprocating motor comprising:
an armature having a toroidal coil and a pair of armature yokes made from magnetic material to hold said toroidal coil;
a cylindrical element having a magnetic structure facing said armature through an air gap in a radial direction, said cylindrical element enabling linear relative movement with respect to said armature in an axial direction;
an axis for supporting one of said armature and said cylindrical element; and
a housing for supporting said axis, the other of said armature and said cylindrical element being coaxially fixed to said housing,
wherein each of said pair of armature yokes has a single toroidal magnetic tooth that is formed as a projection on the surface facing said cylindrical element, and said magnetic structure of said cylindrical element has two pairs of permanent magnets of S pole and N pole that are fitted on a cylinder portion of said cylindrical element made from magnetic material, one pair of said permanent magnets can face said toroidal magnetic tooth of one of said armature yokes and the other pair of said permanent magnets can face said toroidal magnetic tooth of the other of said armature yokes, and wherein said two pairs of permanent magnets are arranged so that one toroidal magnetic tooth faces N pole of one pair of permanent magnets when the other toroidal magnetic tooth faces S pole of the other pair of permanent magnets, and
wherein magnetic force acted between said armature and said magnetic structure of said cylindrical element generated by the energized toroidal coil relatively reciprocates one of said armature and said cylindrical element along said axis with respect to said housing, or relatively reciprocates one of said armature and said cylindrical element together with said axis with respect to said housing.

2. A toroidal-coil linear reciprocating motor comprising:
an armature having a toroidal coil and a pair of armature yokes made from magnetic material to hold said toroidal coil;
a cylindrical element having a magnetic structure facing said armature through an air gap in a radial direction, said cylindrical element enabling linear relative movement with respect to said armature in an axial direction;
an axis for supporting one of said armature and said cylindrical element; and
a housing for supporting said axis, the other of said armature and said cylindrical element being coaxially fixed to said housing,
wherein said magnetic structure of said cylindrical element has a pair of toroidal magnetic teeth without having permanent magnets, one of said armature yokes has a pair of permanent magnets of S pole and N pole that are arranged in the axial direction and can face one of said toroidal magnetic teeth, and the other of said armature yokes has a pair of permanent magnets of S pole and N pole that are arranged in the axial direction can face the other of said toroidal magnetic teeth, and wherein said two pairs of permanent magnets are arranged so that one toroidal magnetic tooth faces N pole of one pair of permanent magnets when the other toroidal magnetic tooth faces S pole of the other pair of permanent magnets, and
wherein magnetic force acted between said armature and said magnetic structure of said cylindrical element generated by the energized toroidal coil relatively reciprocates one of said armature and said cylindrical element along said axis with respect to said housing, or relatively reciprocates one of said armature and said cylindrical element together with said axis with respect to said housing.

3. A toroidal-coil linear reciprocating motor comprising:
an armature having a toroidal coil and a pair of armature yokes made from magnetic material to hold said toroidal coil;
a cylindrical element having a magnetic structure facing said armature through an air gap in a radial direction, said cylindrical element enabling linear relative movement with respect to said armature in an axial direction;
an axis for supporting one of said armature and said cylindrical element; and
a housing for supporting said axis, the other of said armature and said cylindrical element being coaxially fixed to said housing,
wherein each of said pair of armature yokes has a single toroidal magnetic tooth, and said magnetic structure of said cylindrical element has a pair of moving units each of which has a permanent magnet magnetized in S pole and N pole in the axial direction and a pair of magnetic poles sandwiching said permanent magnet from both sides in the axial direction without having small teeth on their outer circumferences, and wherein the permanent magnets of said moving units are arranged so that the directions of magnetizations are opposite to each other and so that one toroidal magnetic tooth faces said magnetic pole contacting N pole of one moving unit when the other toroidal magnetic tooth faces said magnetic pole contacting S pole of the other moving unit, and
wherein magnetic force acted between said armature and said magnetic structure of said cylindrical element generated by the energized toroidal coil relatively reciprocates one of said armature and said cylindrical element along said axis with respect to said housing, or relatively reciprocates one of said armature and said cylindrical element together with said axis with respect to said housing.

4. The toroidal-coil linear reciprocating motor according to any one of claims 1–3, wherein said cylindrical element is supported by said axis, and said armature is fixed to said housing around said cylindrical element, wherein said axis is fixed to said housing, and wherein said cylindrical element relatively reciprocates along said axis with respect to said housing.

5. The toroidal-coil linear reciprocating motor according to any one of claims 1–3, wherein said cylindrical element is supported by said axis, and said armature is fixed to said housing around said cylindrical element, wherein said axis can reciprocate in the axial direction with respect to said housing, and wherein said cylindrical element relatively reciprocates together with said axis with respect to said housing.

6. The toroidal-coil linear reciprocating motor according to any one of claims 1–3, wherein said armature is supported by said axis, and said cylindrical element is fixed to said housing around said armature, wherein said axis is fixed to said housing, and wherein said armature relatively reciprocates along said axis with respect to said housing.

7. The toroidal-coil linear reciprocating motor according to any one of claims 1–3, wherein said armature is supported by said axis, and said cylindrical element is fixed to said housing around said armature, wherein said axis can reciprocate in the axial direction with respect to said housing, and wherein said armature relatively reciprocates together with said axis with respect to said housing.

8. A cylinder compressor or pump comprising:
the toroidal-coil linear reciprocating motor according to one of claims 1, through 3, wherein said cylindrical element is fixed to said axis so that they linearly move together;
a pair of cylinders that are attached at both side of said housing in the axial direction; and
a pair of pistons that are attached at the respective ends of said axis so that said pistons reciprocate within said cylinders in the axial direction when an electric current is applied to said toroidal coil.

9. The cylinder compressor or pump according to claim 8, further comprising a pair of springs each of which is arranged between said piston and said cylinder or between said piston and a stator portion, and wherein frequency of the applied alternating current is adjusted to resonant frequency to cause resonance of said pistons in consideration of spring constant of said springs and inertia of the moving portion.

* * * * *